INVENTOR.
Gregor Jonsson
BY: Olson & Trexler
attys

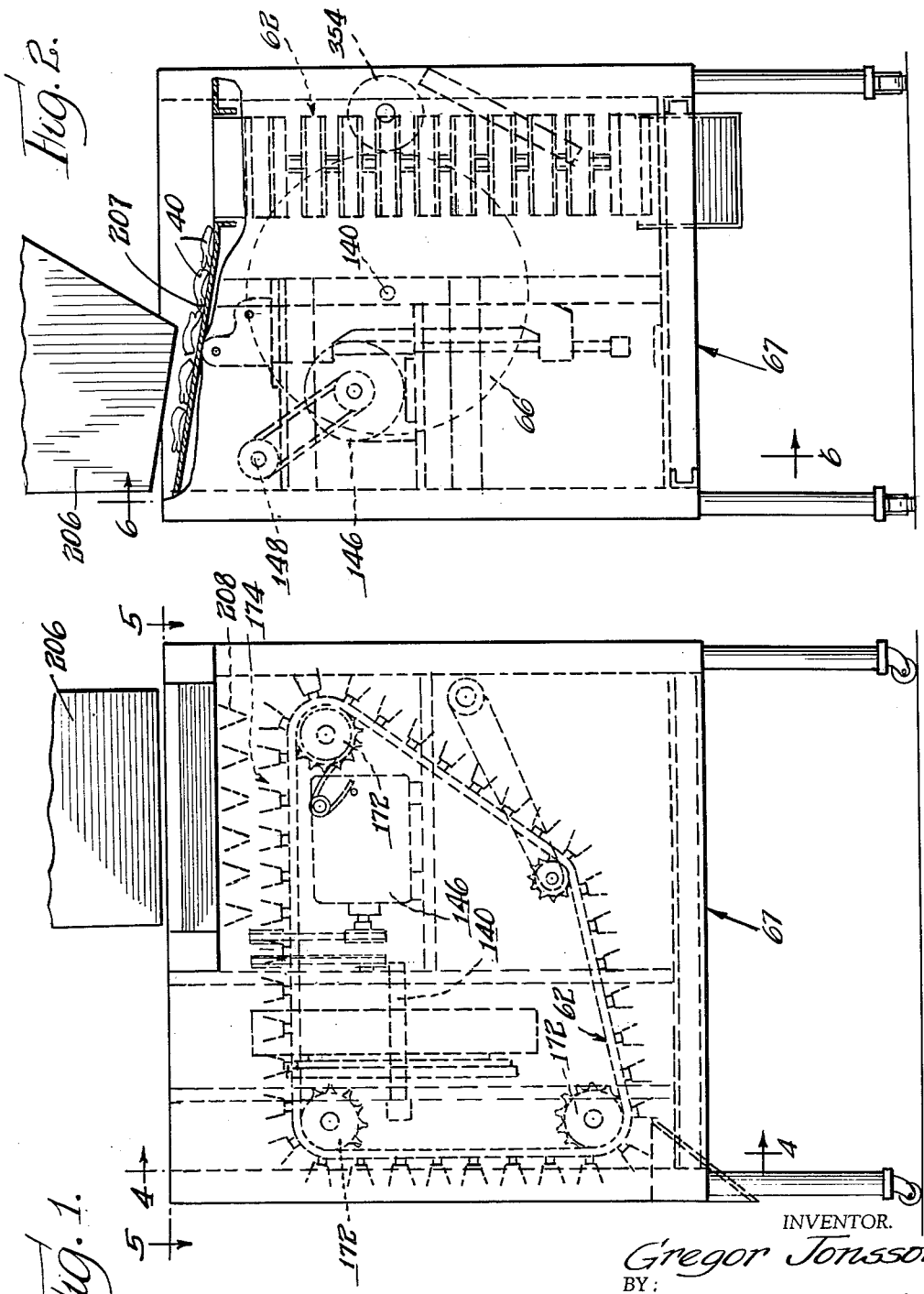

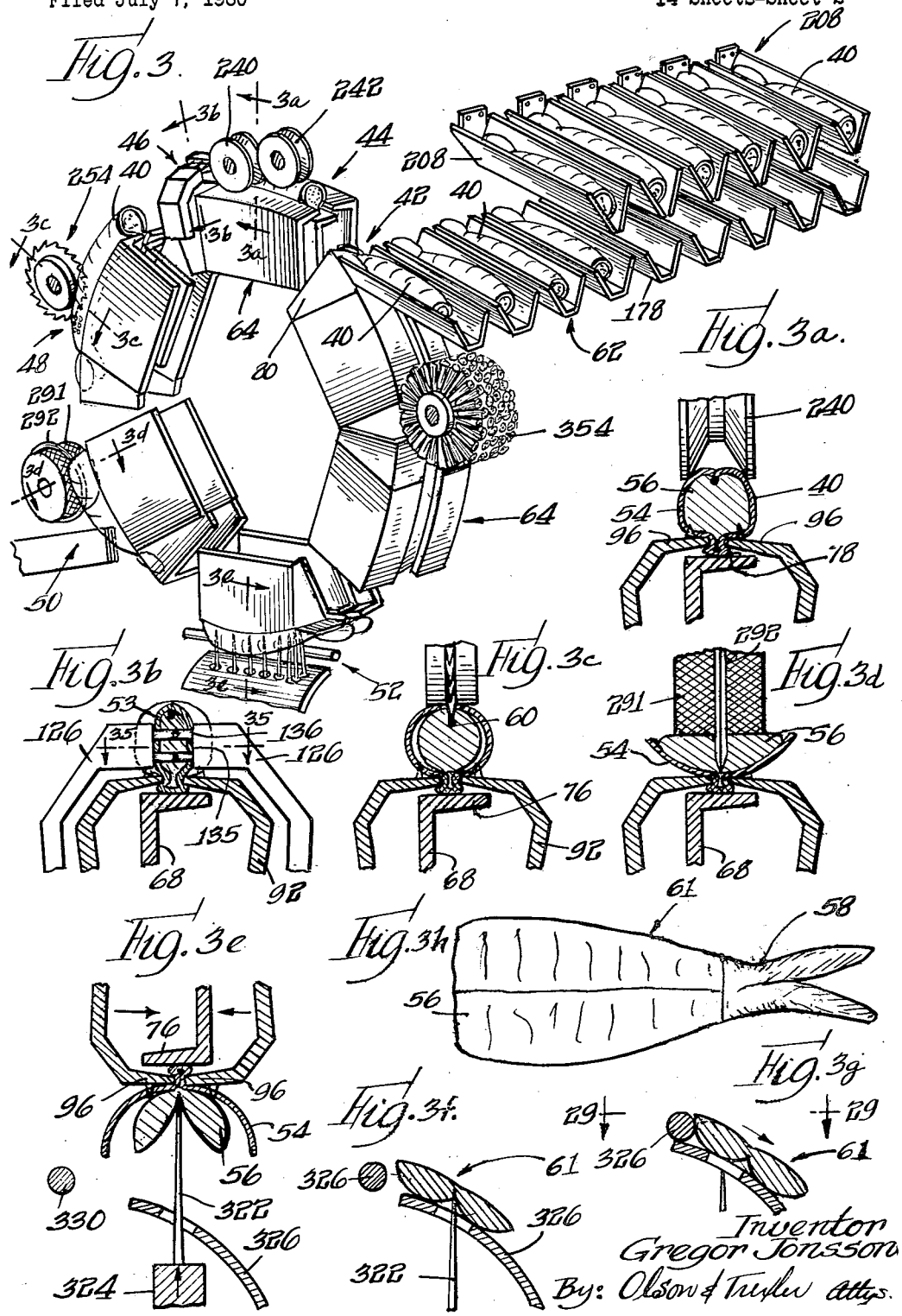

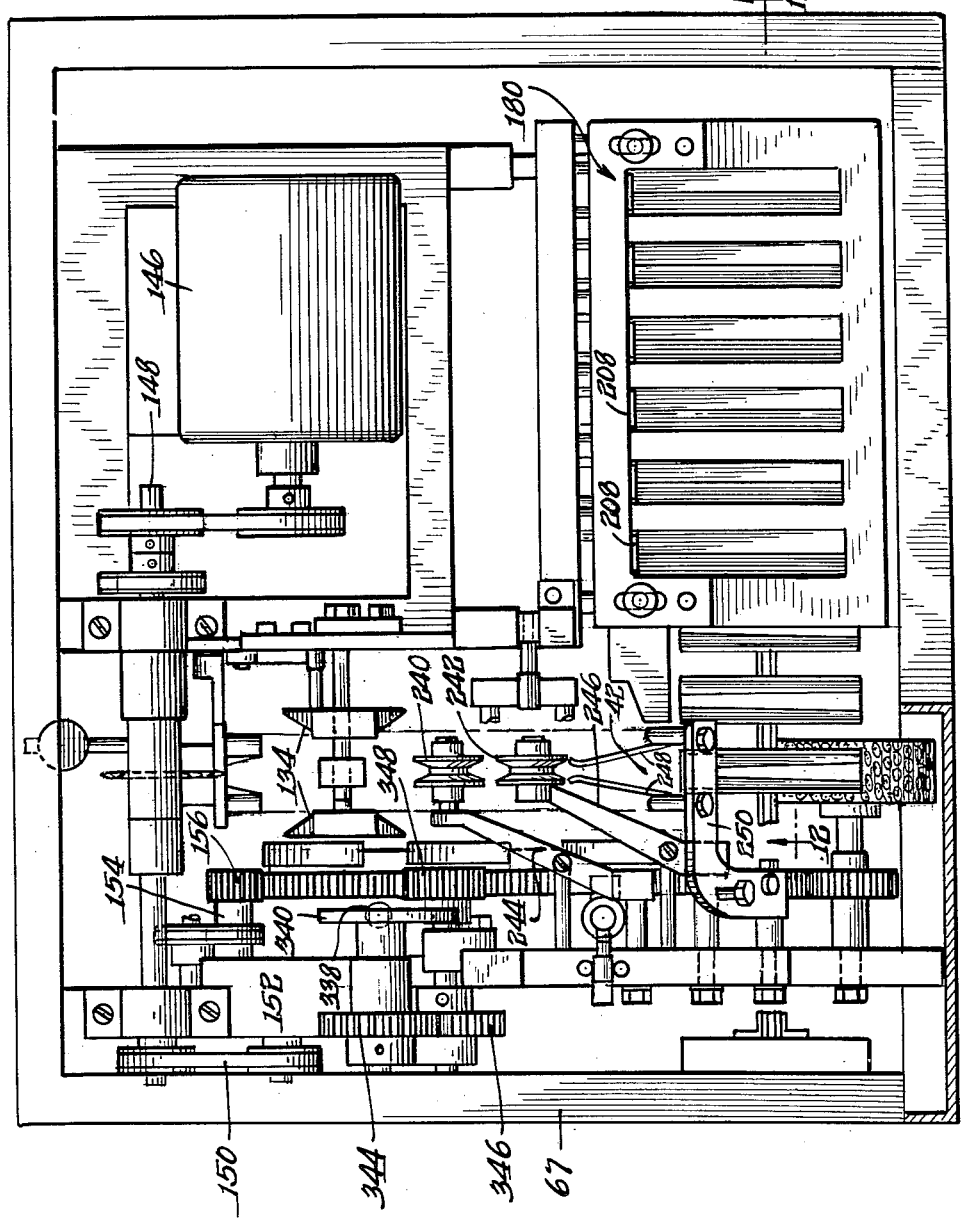

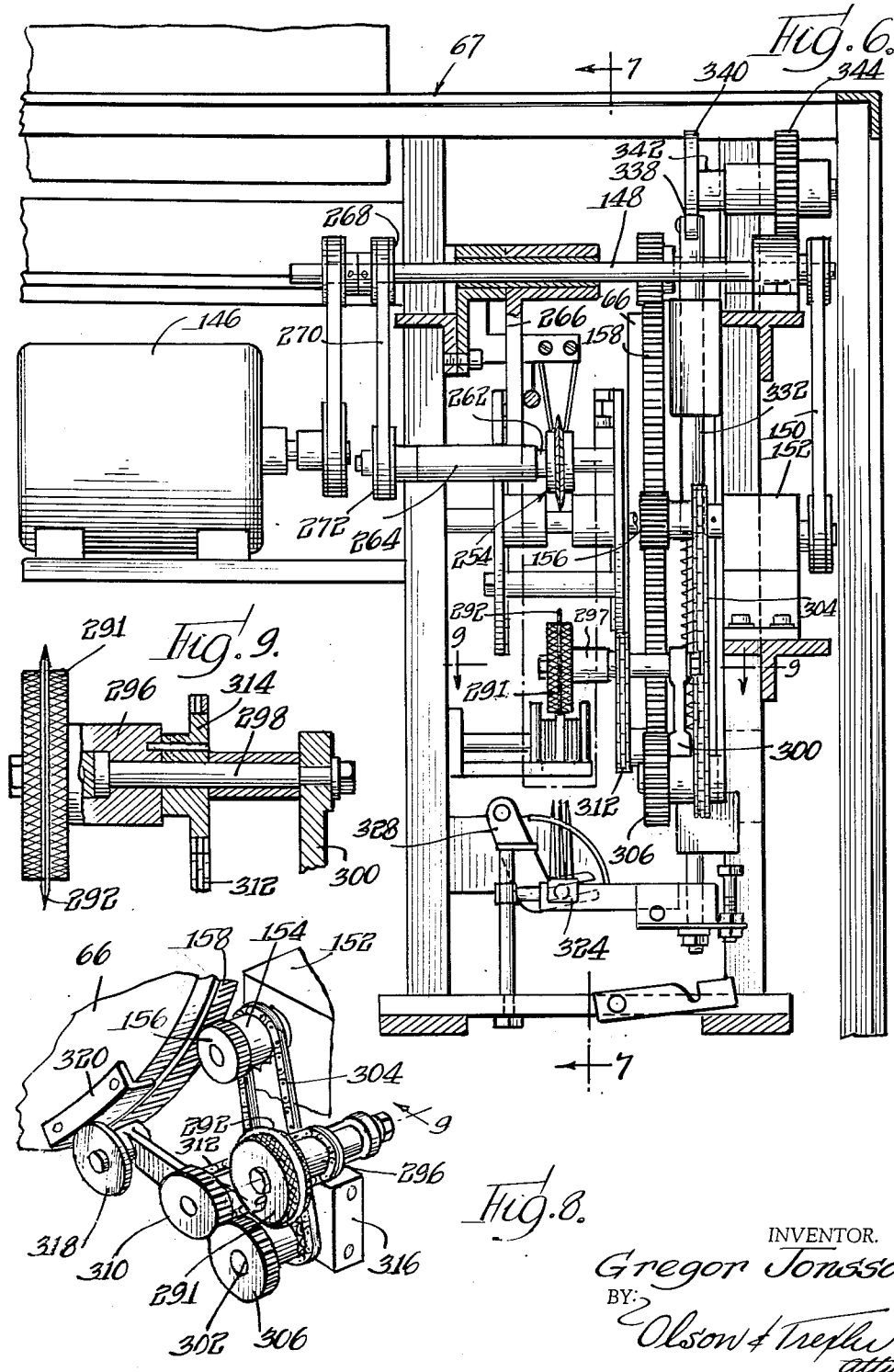

March 3, 1964  G. JONSSON  3,122,777
MACHINE FOR CLEANING SHRIMP
Filed July 7, 1960  14 Sheets-Sheet 6

INVENTOR.
Gregor Jonsson
BY:
Olson & Trexler
Attys.

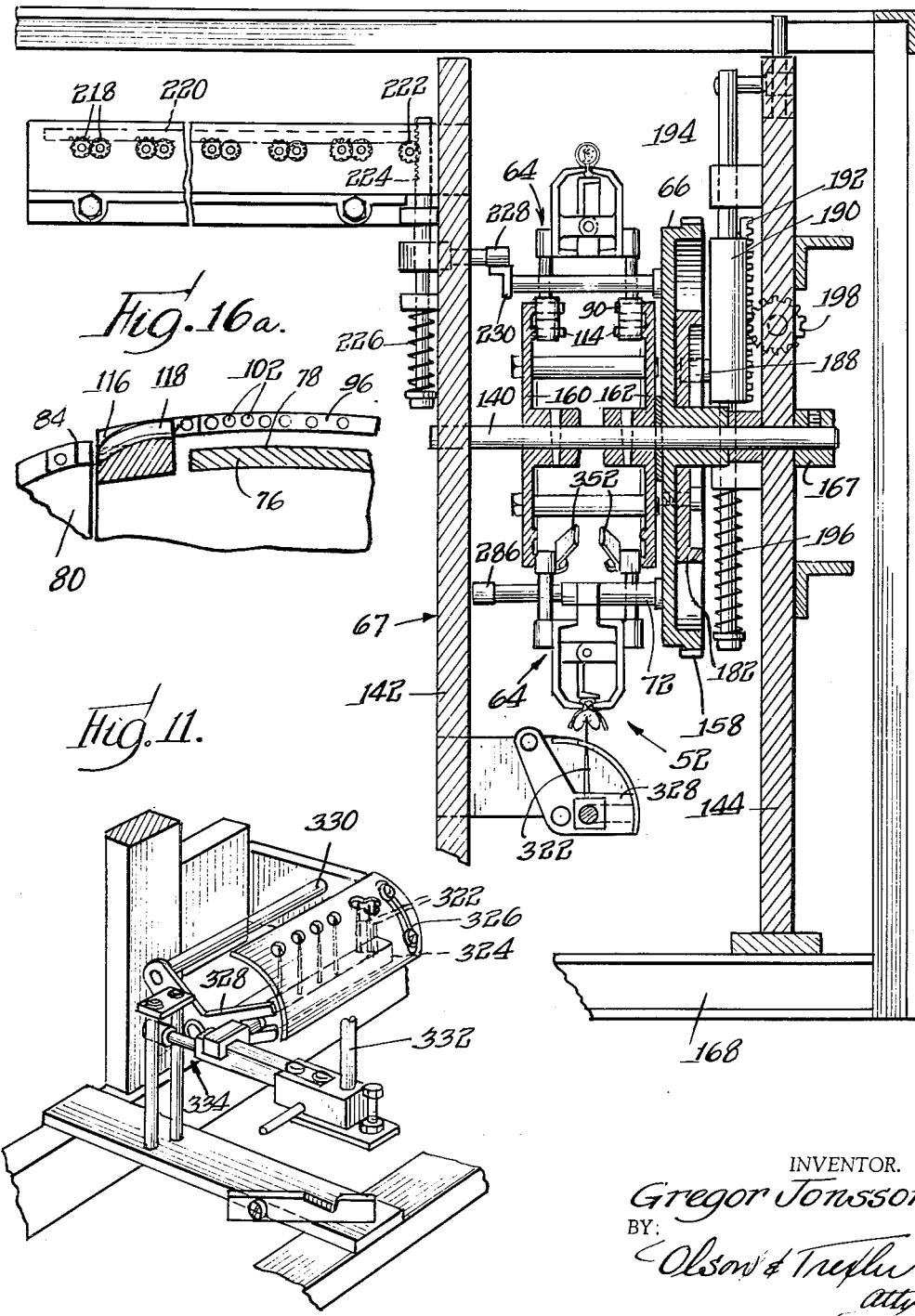

March 3, 1964  G. JONSSON  3,122,777
MACHINE FOR CLEANING SHRIMP
Filed July 7, 1960  14 Sheets-Sheet 8
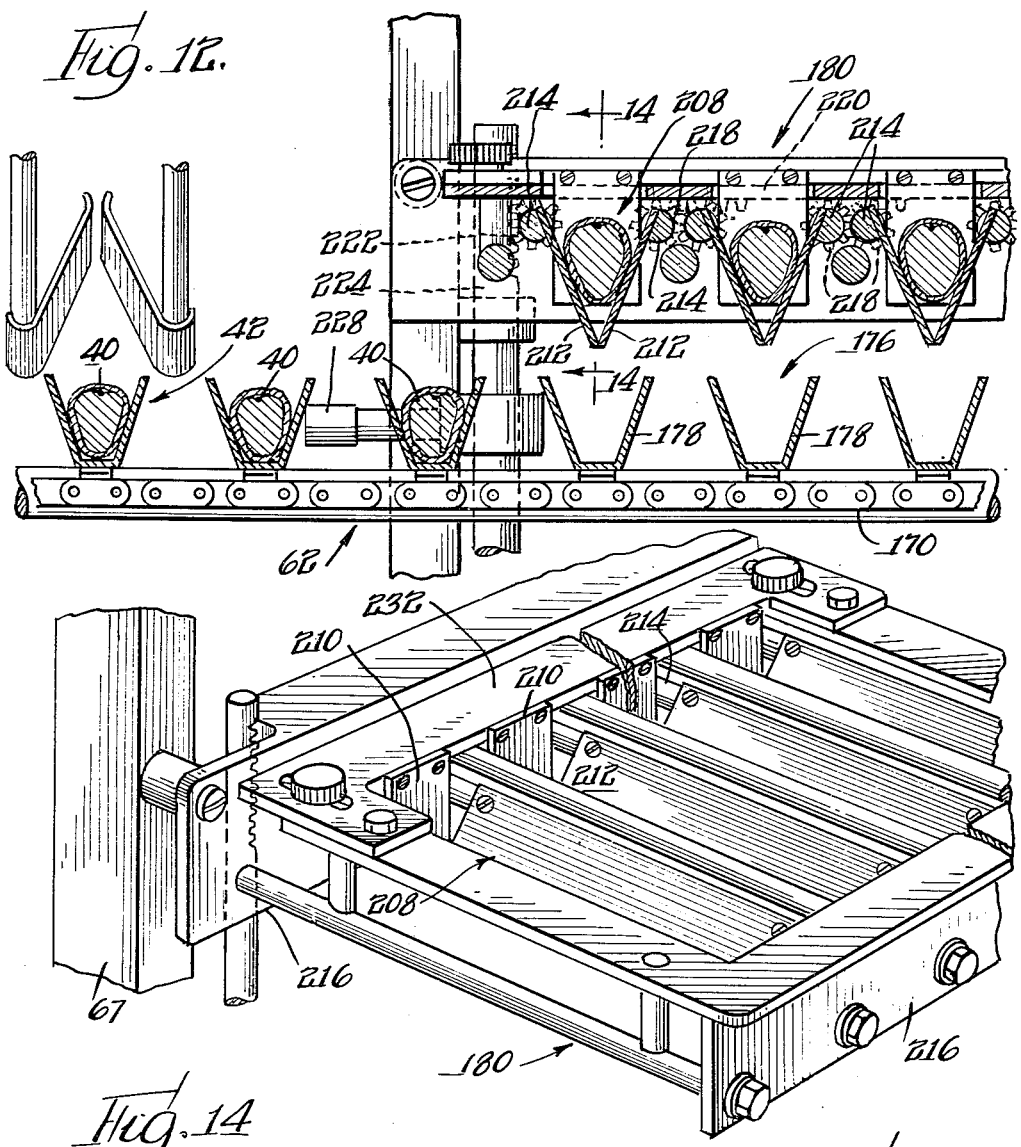
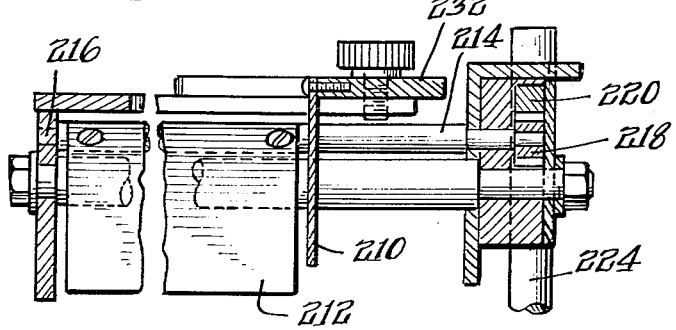
INVENTOR.
Gregor Jonsson
BY Olson & Trexler
attys.

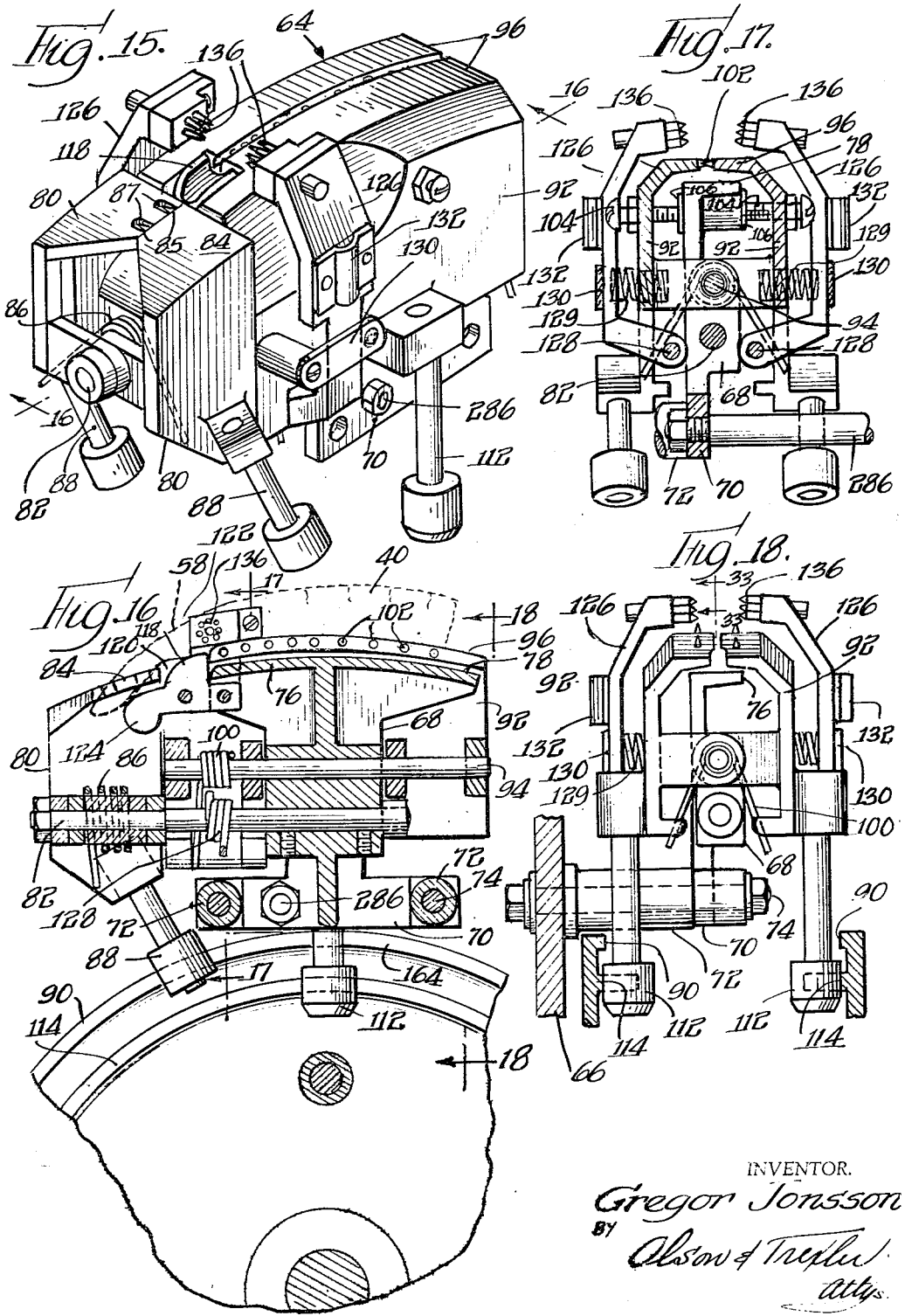

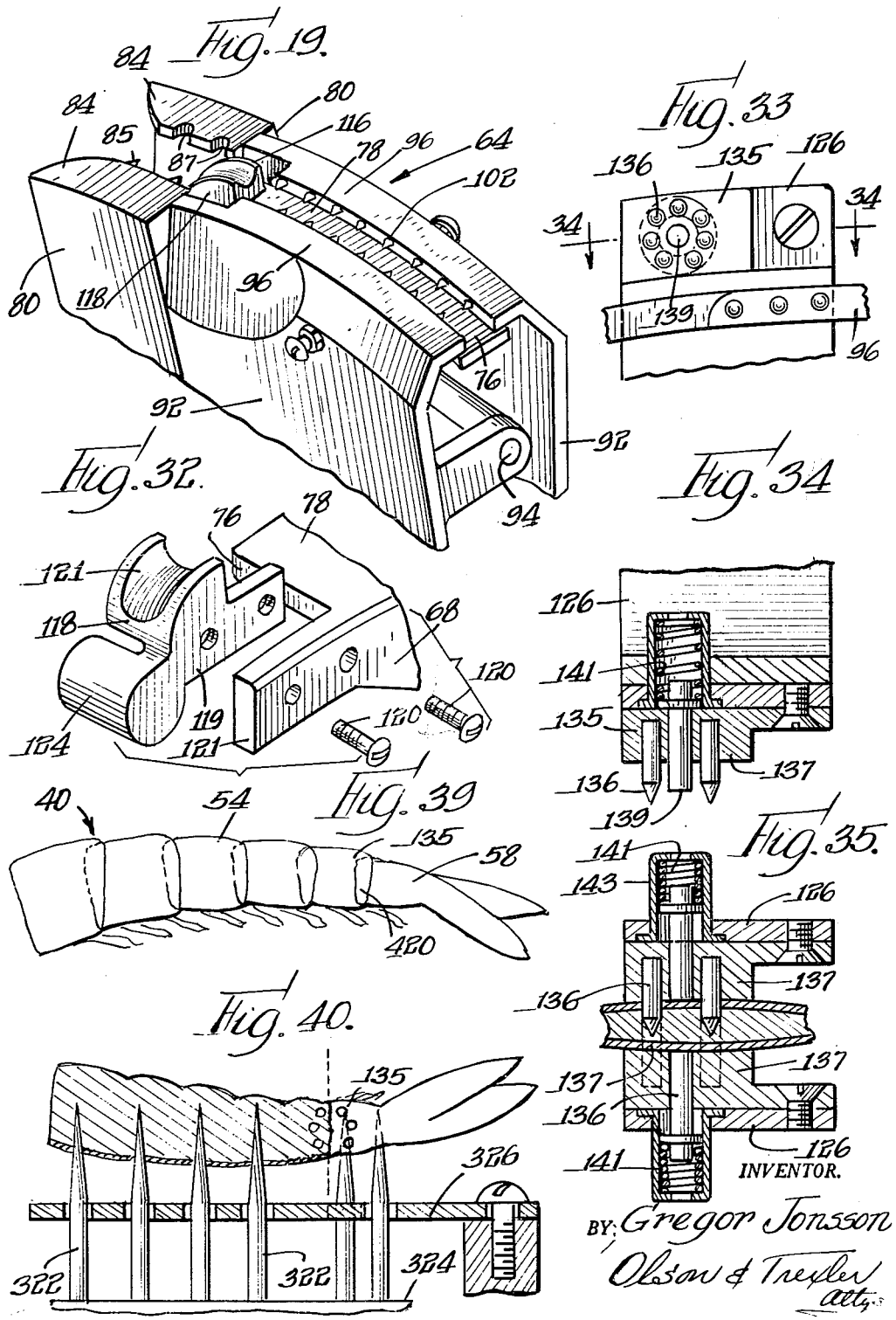

March 3, 1964  G. JONSSON  3,122,777
MACHINE FOR CLEANING SHRIMP
Filed July 7, 1960  14 Sheets-Sheet 11

INVENTOR.
Gregor Jonsson
BY Olson & Trexler
attys.

March 3, 1964  G. JONSSON  3,122,777
MACHINE FOR CLEANING SHRIMP
Filed July 7, 1960  14 Sheets-Sheet 12
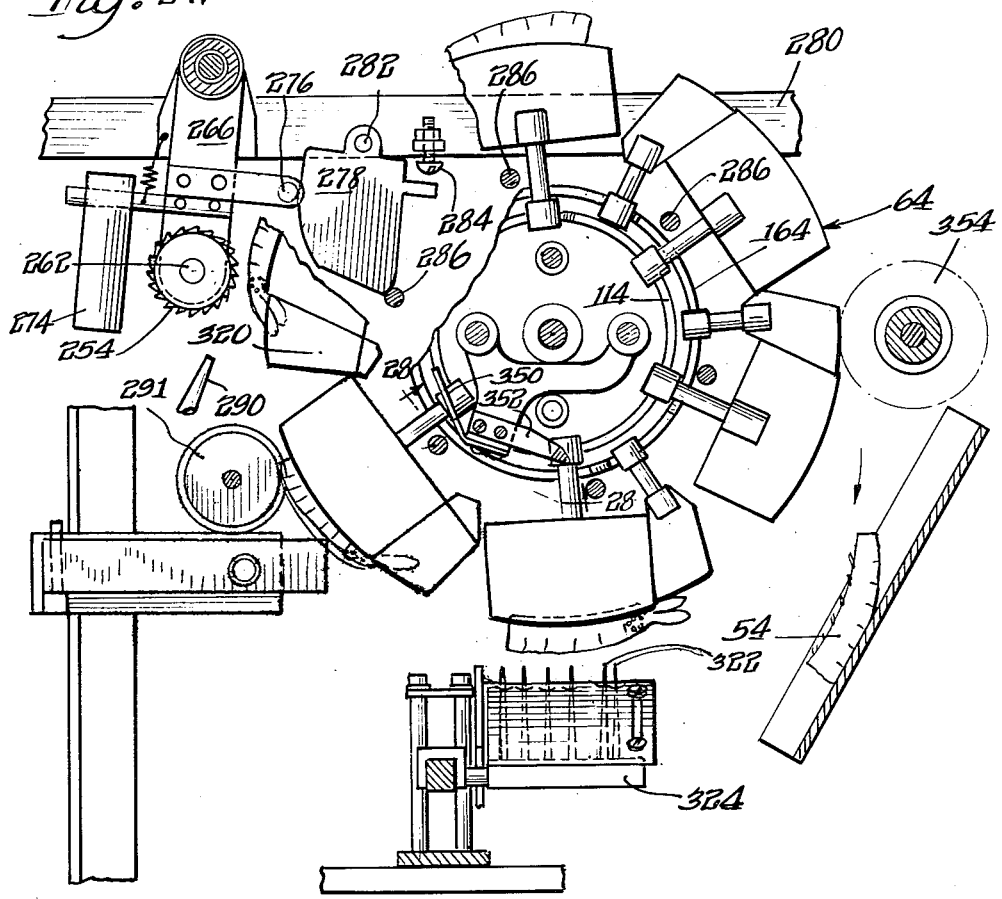
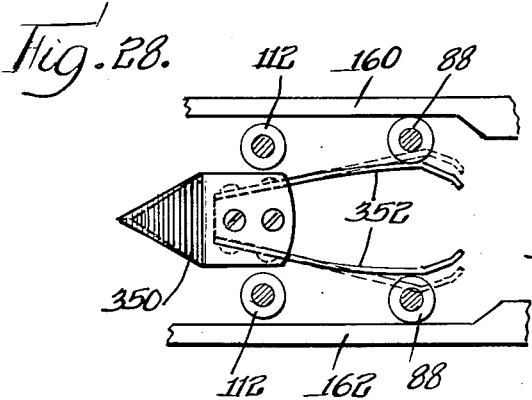
INVENTOR.
Gregor Jonsson
BY Olson & Trexler
Att'ys

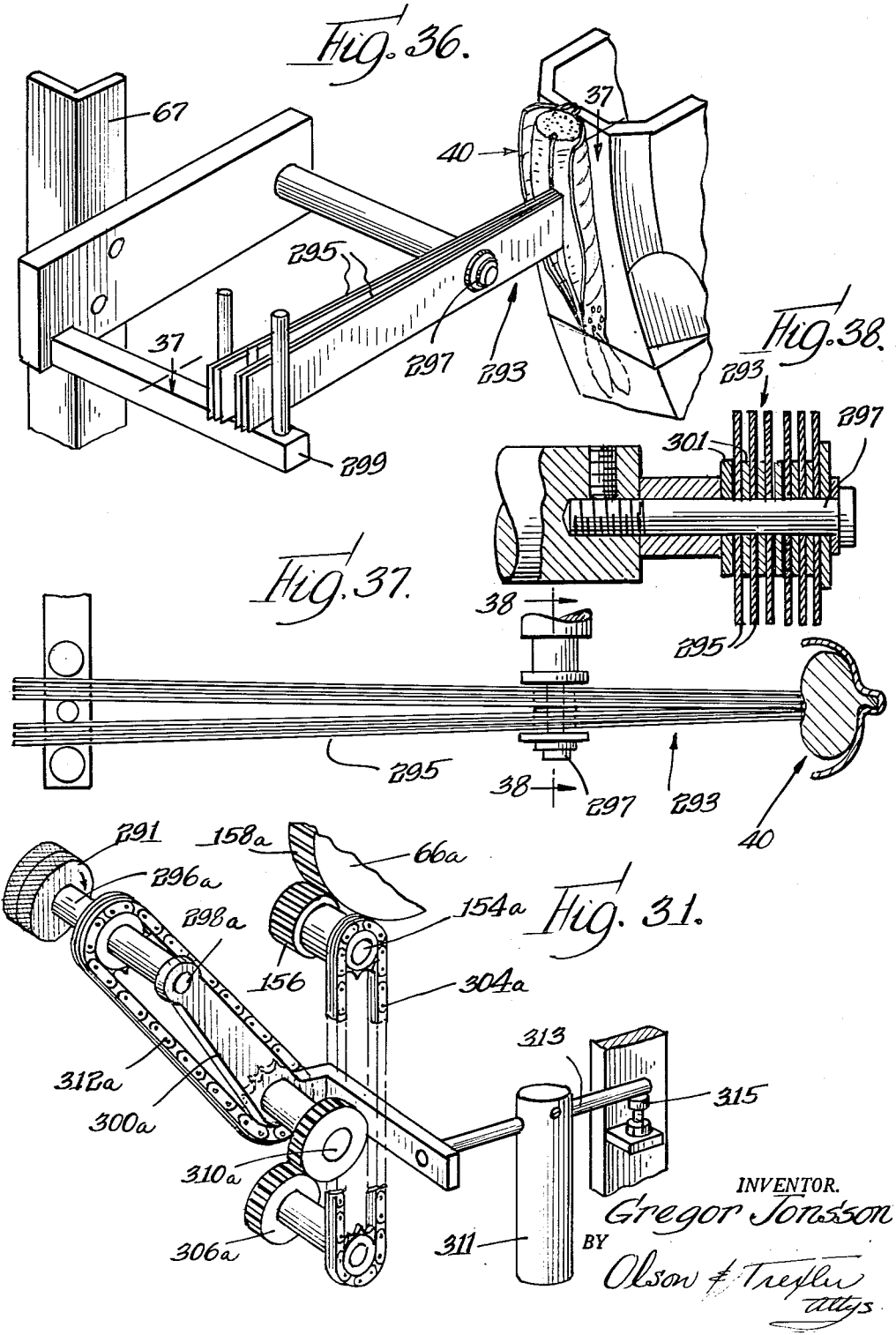

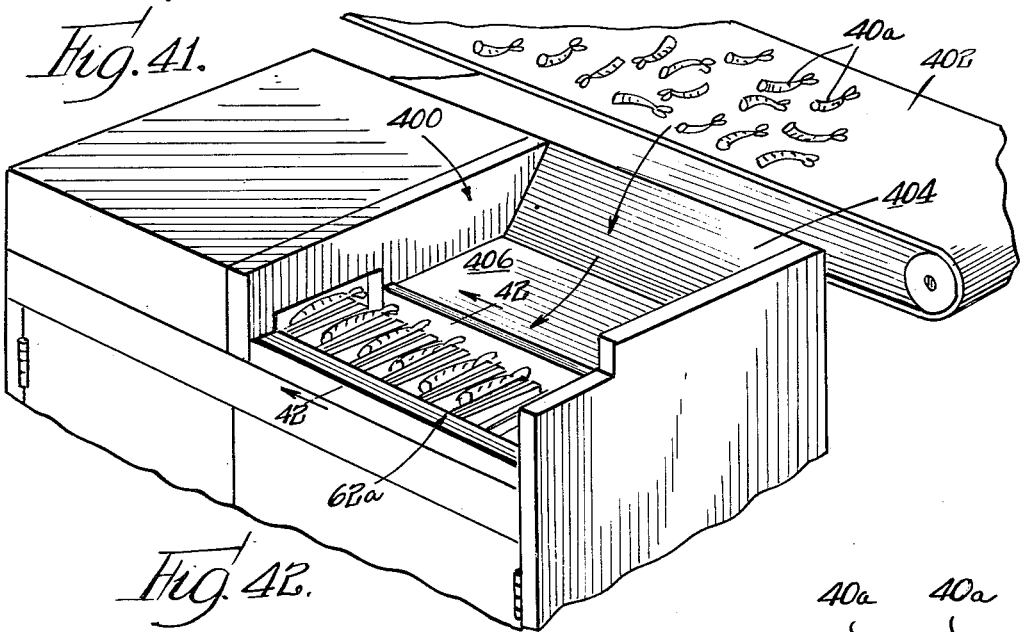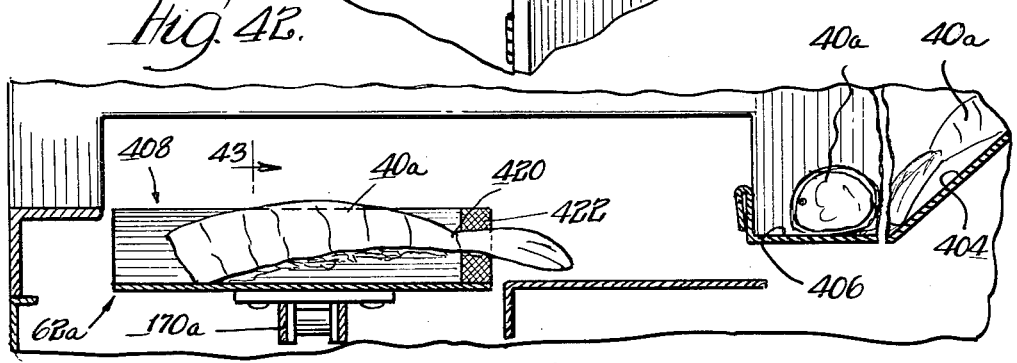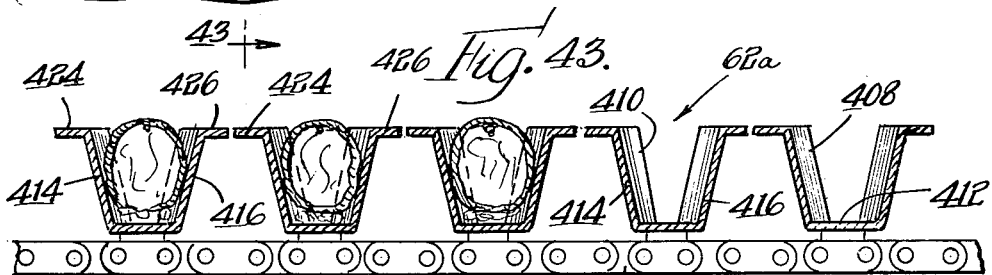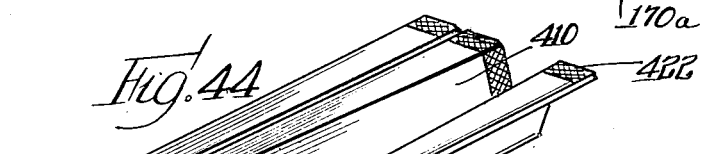

United States Patent Office 3,122,777
Patented Mar. 3, 1964

3,122,777
MACHINE FOR CLEANING SHRIMP
Gregor Jonsson, 950 East West Leigh Road,
Lake Forest, Ill.
Filed July 7, 1960, Ser. No. 41,304
27 Claims. (Cl. 17—2)

The present invention relates to the automatic cleaning of shrimp.

One object of the invention is to provide a shrimp cleaning machine having a new and improved construction which operates with great efficiency and dependability to completely remove the sand vein of shrimp and to thoroughly clean the area from which the sand vein is removed.

A further object is to provide a shrimp cleaning machine, as recited in the preceding object, which is capable of slitting the bodies of individual shrimp longitudinally to any desired depth as an incident to effecting a thorough cleaning of the areas of the shrimp bodies from which the sand veins have been removed.

Another object is to provide a new and improved shrimp cleaning machine which operates automatically to remove the sand vein from shrimp and separate the main body or meat of the shrimp from the surrounding shell while at the same time maintaining the tail of the shrimp intact and attached to the meat of the shrimp.

Another object is to provide, in a shrimp cleaning machine of the character recited novel and fully automatic means for separating the main body portion of a shrimp shell from the tail of the shrimp and leaving the latter intact and securely attached to the meat of the shrimp.

A more specific object is to provide for use in separating the body and tail portions of a shrimp shell, a novel and fully automatic means of shattering a shrimp shell at the juncture of the main body of the shell with the tail of the shrimp. A related object is to provide means for shattering a shrimp shell as recited without crushing the meat within the shattered portion of the shell.

A further object is to provide an automatic shrimp cleaning machine of the character recited in which the removal of the main portion of the shell of individual shrimp from the body and tail of the shrimp is facilitated by new and improved shell shattering means which will operate efficiently and dependably without becoming clogged.

Another object is to provide an automatic machine which will clean shrimp in the manner recited and leave on each shrimp an intact tail of the desired length.

Another object is to provide in this machine a simple and extremely effective means of adjusting the length of the intact tail left on each shrimp.

Another object is to provide a continuous process shrimp cleaning machine having a new and improved construction which provides for extremely efficient and safe manual loading of a continuous succession of shrimp into the machine while at the same time radially simplifying the structure which facilitates manual loading of the shrimp.

Another object is to provide a shrimp cleaning machine which will slip the body section of a shrimp shell longitudinally off the meat of the shrimp past the intact tail on the shrimp while at the same time effectively avoiding the application to the shrimp tail of forces which would separate it from the meat of the shrimp.

Another object is to provide a shrimp cleaning machine which operates automatically to slit the main body of a deveined shrimp longitudinally while leaving the tail on the shrimp intact.

An additional object is to provide a shrimp cleaning machine, as recited, with improved means for separating a deveined shrimp body from its longitudinally moving shell.

Still another object of the invention is to provide an improved shrimp cleaning machine of the character set forth in the above objects which is very reliable in operation and free of service problems.

Other objects and advantages will become apparent from the following description having reference to the drawings, in which:

FIG. 1 is a front elevation view of the improved machine in which certain internal components are shown in dotted lines;

FIG. 2 is an end elevation of the machine taken from the left with reference to FIG. 1 some external parts being broken away for clearness in illustration and certain internal components being shown in dotted lines;

FIG. 3 is a perspective view illustrating the manner in which fundamental components of the machine are arranged to clean shrimp in accordance with the method of this invention;

FIG. 3a is a fragmentary sectional view on an enlarged scale taken along the line 3a—3a of FIG. 3;

FIG. 3b is a fragmentary sectional view on an enlarged scale taken along the line 3b—3b of FIG. 3;

FIG. 3c is a fragmentary sectional view on an enlarged scale taken along the line 3c—3c of FIG. 3;

FIG. 3d is a fragmentary sectional view on an enlarged scale taken along the line 3d—3d of FIG. 3;

FIG. 3e is a fragmentary sectional view on an enlarged scale taken along the line 3e—3e of FIG. 3;

FIG. 3f is a fragmentary sectional view on an enlarged scale showing the same elements appearing in the lower portion of FIG. 3 at a later stage in its operating cycle;

FIG. 3g is a view similar to FIG. 3f showing the structure of FIG. 3f in a still later stage of its operational cycle;

FIG. 3h is a perspective view of a "butterfly shrimp" cleaned by the machine in accordance with the invention;

FIG. 5 is an enlarged scale, horizontal sectional view of the machine taken along the line 5—5 of FIG. 1;

FIG. 6 is an enlarged scale vertical sectional view of the machine taken along the line 6—6 of FIG. 2;

FIG. 8 is a fragmentary perspective view showing the shrimp spreading and slitting mechanism;

FIG. 9 is a fragmentary sectional view on an enlarged scale taken along the line 9—9 in FIG. 6;

FIG. 10 is a vertical sectional view taken along the line 10—10 of FIG. 4;

FIG. 11 is a fragmentary perspective view of the shrimp impaling mechanism;

FIG. 12 is a fragmentary sectional view of the shrimp loading and conveyor mechanism taken along the line 12—12 of FIG. 5;

FIG. 13 is a perspective view of the shrimp loading device;

FIG. 14 is a fragmentary sectional view taken along the line 14—14 of FIG. 12;

FIG. 15 is a perspective view of a shrimp holder unit of the machine;

FIG. 16 is a longitudinal sectional view of a holder unit and coacting cams taken with reference to line 16—16 of FIG. 15;

FIG. 16a is a detail view on an enlarged scale of shrimp tail deflecting structure shown in FIG. 16;

FIG. 17 is a transverse sectional view of a holder unit taken along the line 17—17 of FIG. 16;

FIG. 18 is a sectional view taken along the line 18—18 of FIG. 16;

3

Figure 4:
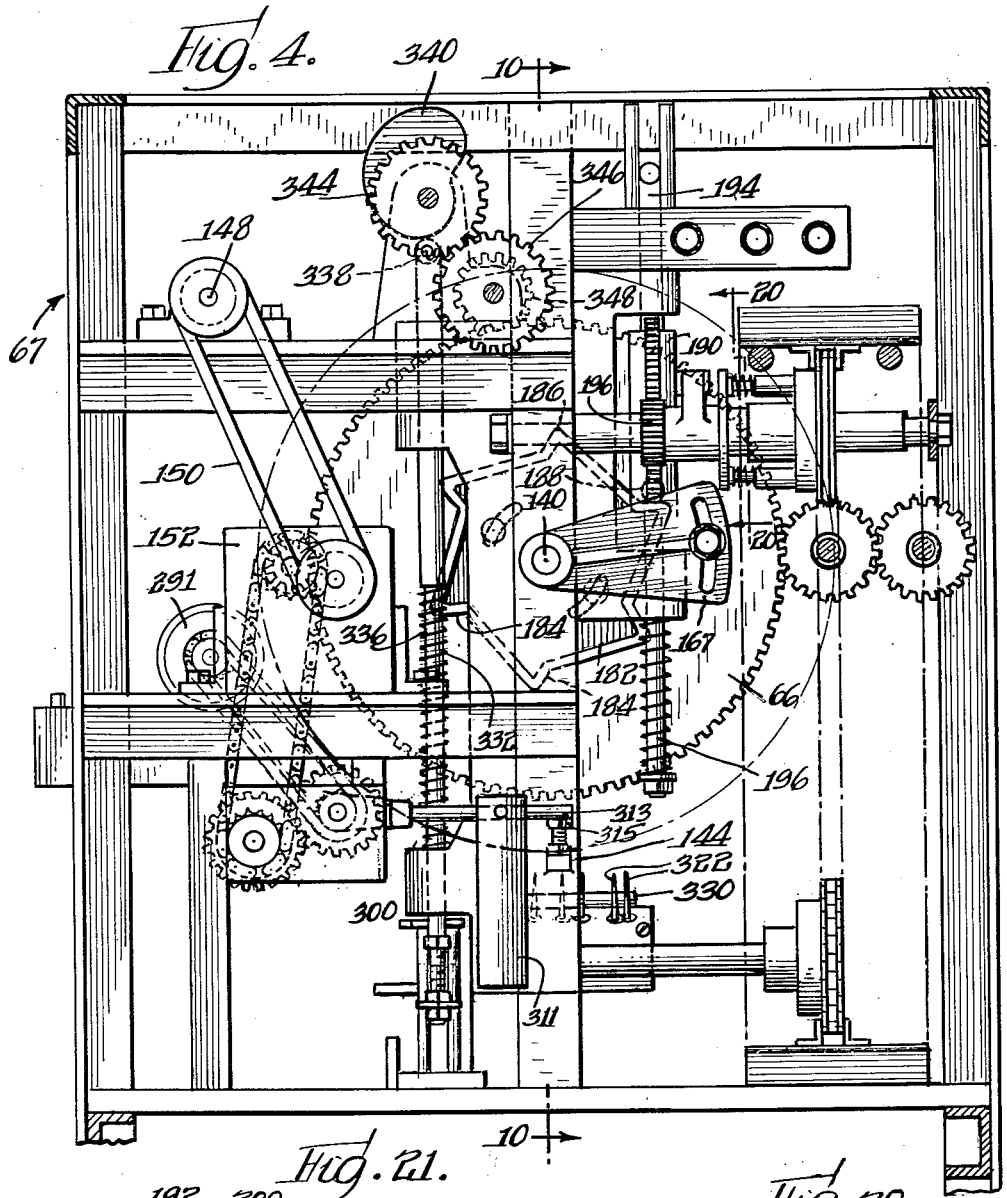
FIG. 4 is an enlarged scale vertical sectional view of the machine taken along the line 4—4 of FIG. 1.
Figure 21:
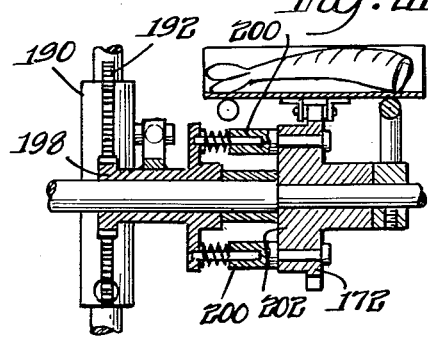
Figure 20:
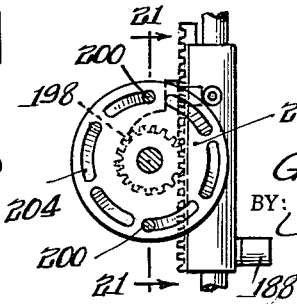
Figure 7:
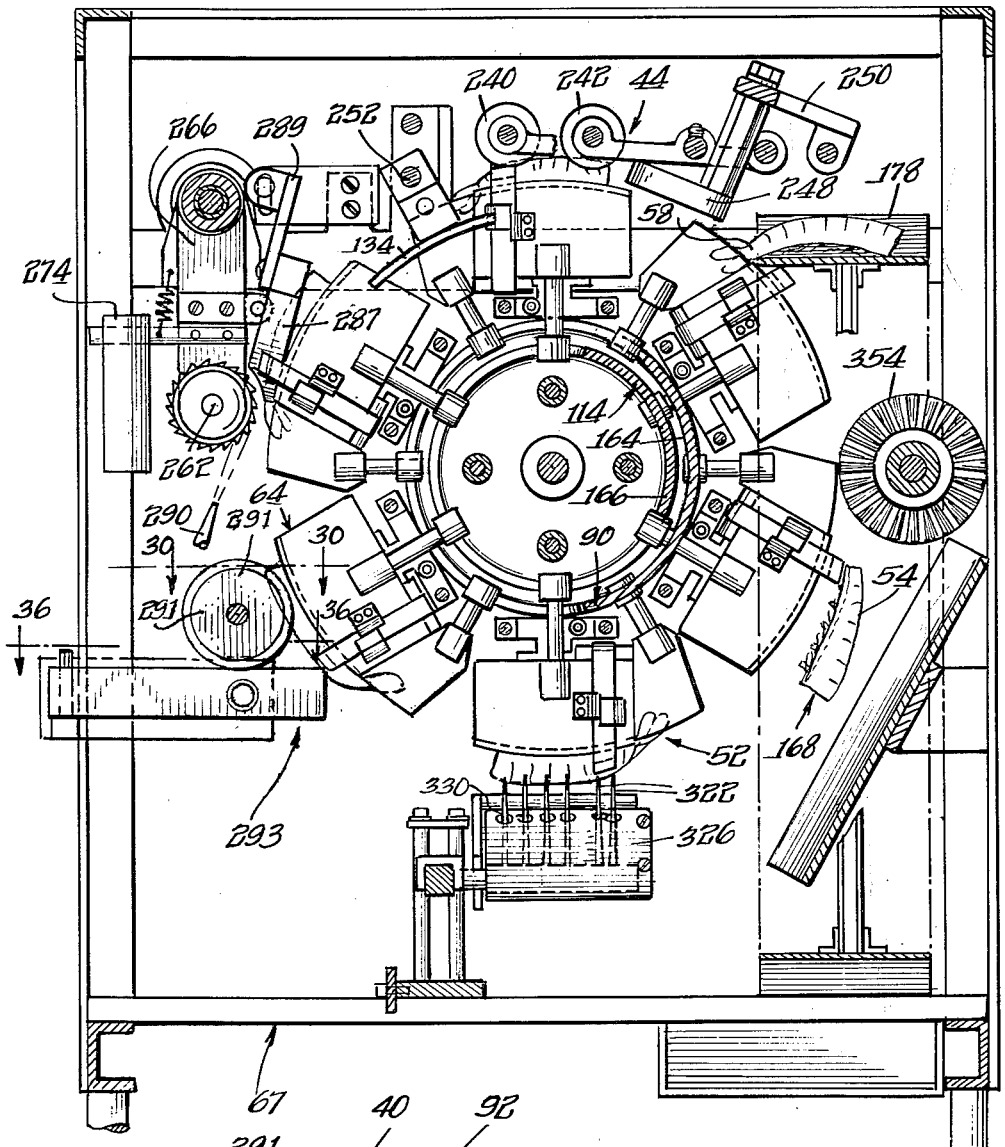
FIG. 7 is a vertical sectional view taken along the line 7—7 of FIG. 6.
Figure 30:
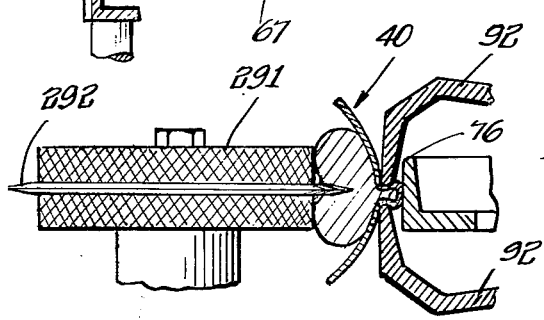
Figure 22:
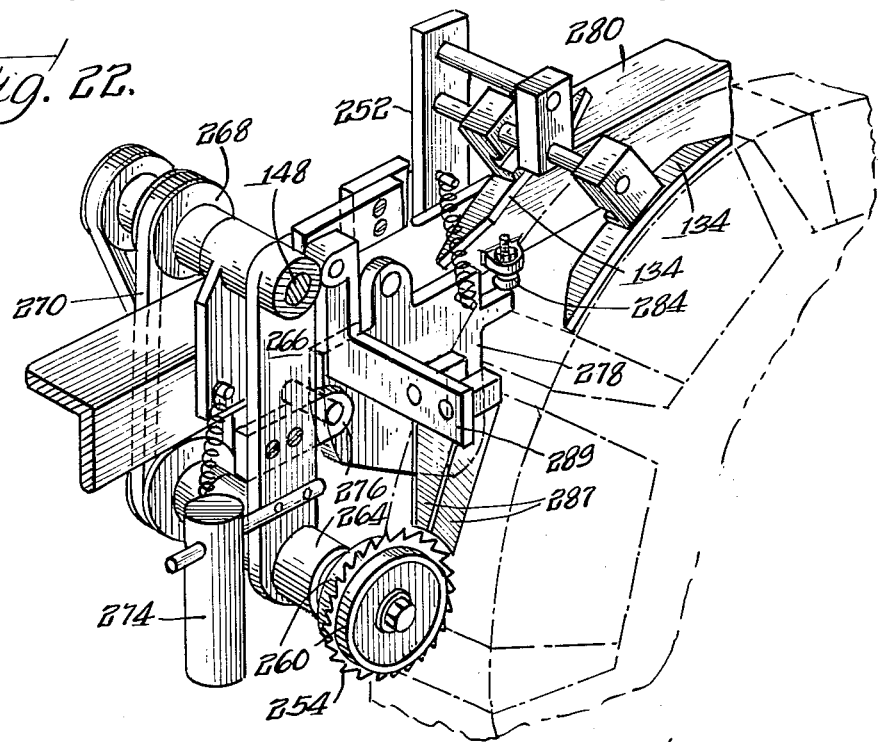
Figure 23:
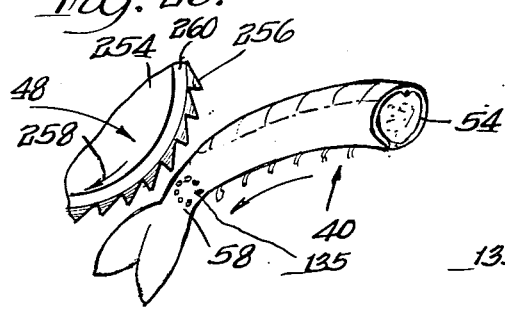
Figure 24:
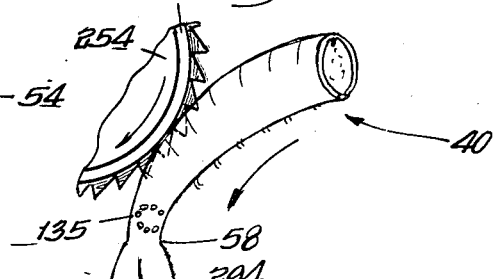
Figures 25, 26:
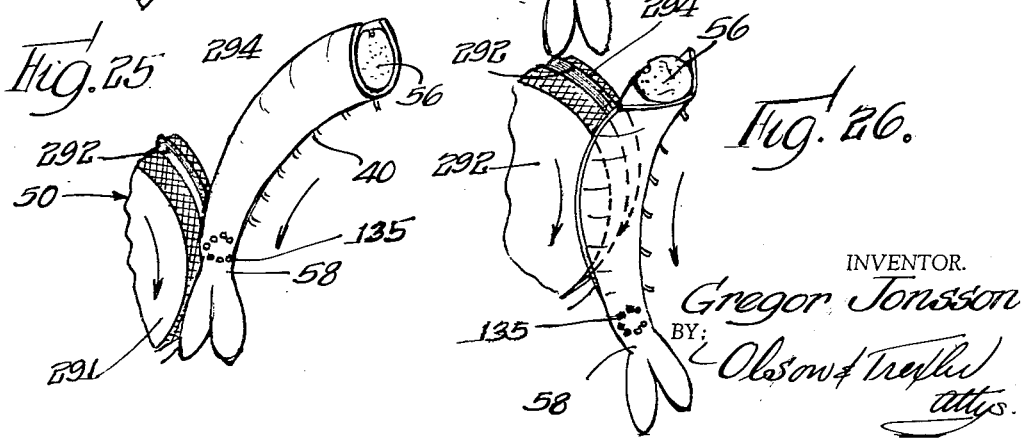

FIG. 19 is a perspective view showing shrimp engaging elements of a holder unit;

FIG. 20 is a sectional view of the conveyor drive taken along the line 20—20 of FIG. 4;

FIG. 21 is a sectional view taken with reference to the line 21—21 of FIG. 20;

FIG. 22 is a perspective view showing the shell ripping and deveining mechanism and adjacent cam actuators for the shell shattering jaws;

FIG. 23 is a fragmentary side view showing the position of the shell ripping and deveining cutter as it is lifted over the tail of a shrimp;

FIG. 24 is a view similar to FIG. 23 but showing the cutter ripping the shrimp shell and removing a sand vein;

FIG. 25 is a perspective view showing the shrimp spreading roller and slitting cutter as it is lifted over the tail of a shrimp;

FIG. 26 is a view similar to FIG. 25 but showing the roller and the cutter spreading and slitting the body of a shrimp;

FIG. 27 is a fragmentary sectional view generally similar to FIG. 7 but simplified and sectioned somewhat differently to further illustrate coacting parts;

FIG. 28 is a fragmentary sectional view taken along the line 28—28 of FIG. 27;

FIG. 29 is a fragmentary plan view taken with reference to line 29—29 of FIG. 3g;

FIG. 30 is a fragmentary sectional view on an enlarged scale taken with reference to the line 30—30 of FIGURE 7 and illustrating the action of the shrimp spreader when the shrimp slitting blade has been removed to eliminate slitting of the shrimp body;

FIG. 31 is a perspective view of the shrimp spreader operating mechanism;

FIG. 32 is a fragmentary perspective view illustrating shrimp tail supporting components of a typical shrimp holding unit;

FIG. 33 is an enlarged fragmentary sectional view taken along the line 33—33 of FIG. 18 and showing the operating face of a shrimp shell shattering jaw;

FIG. 34 is a fragmentary sectional view of a shell shattering jaw taken along the line 34—34 of FIG. 33;

FIG. 35 is an enlarged fragmentary sectional view taken with reference to the line 35—35 of FIG. 3b and showing two opposed self shattering jaws fully engaged with a shrimp;

FIG. 36 is a perspective view taken generally with reference to the line 36—36 of FIG. 7 and illustrating the relationship of debris raking structure to a coacting shrimp being cleaned;

FIG. 37 is a fragmentary view on an enlarged scale taken with reference to the line 37—37 of FIG. 36;

FIG. 38 is a fragmentary sectional view on a greater enlarged scale taken with reference to the line 38—38 of FIG. 37;

FIG. 39 is a side view of a typical shrimp to be cleaned by the machine;

FIG. 40 is a fragmentary view illustrating the manner in which a shrimp body and tail are pierced by holding tines at the shell removing station in the machine;

FIG. 41 is a fragmentary perspective view of the machine illustrating a modified construction for facilitating simplified manual loading of shrimp into the machine for cleaning;

FIG. 42 is a sectional view on an enlarged scale taken along the line 42—42 on FIG. 41;

FIG. 43 is a fragmentary sectional view taken along the line 43—43 of FIG. 42; and FIG. 44 is a fragmentary perspective view showing trays of the conveyor illustrated in FIG. 43.

Referring to the drawings in greater detail, the method by which shrimp are cleaned in accordance with the present invention can be visualized with reference to FIG. 3 which illustrates the progression of individual shrimp 40 through a series of spaced stations 42, 44, 46, 48, 50 and 52 where a series of operations are performed on a shrimp to clean and prepare the shrimp in the manner desired for subsequent use.

In the first station 42 a shrimp 40 is clamped by its tail and carried to the next station 44 where the longitudinal underside of the shrimp is firmly clamped and squeezed together somewhat to hold the shrimp and tighten the main body of the shrimp shell 54, FIG. 3a, about the meat 56 of the shrimp.

From the station 44 a shrimp moves on to the station 46 where a section 53 of the shrimp shell 54, FIG. 3b, is shattered in preparation for subsequent separation of the main body of the shrimp shell from the tail 58 of the shrimp, FIG. 3h, which is left intact and attached to the meat 56 of the shrimp.

Each shrimp passes from the shell shattering station 46 on to the next station 48 where the shrimp shell 54 forward of the tail 58 on the shrimp, which is left intact, is ripped open longitudinally along the back of the shrimp and the sand vein 60 dug out, FIG. 3c.

From the station 48, each shrimp passes on to the next station 50 where the body of the shrimp previously ripped opened in the station 48 is spread apart and raked clean of debris to assure thorough removal of all material previously in the sand vein. If desired, the meat or body of the shrimp ahead of the tail section 58 is slit open longitudinally in the station 50 from the dorsal side of the shrimp to a depth far below the situs of the removed sand vein, as illustrated in FIG. 3d.

At the next station 52, the body portion of the split shrimp shell 54 forwardly of the tail 58 is separated from the intact tail 58 and moved longitudinally off the longitudinally slit shrimp body 56 past the tail 58. The removed shell is discarded. FIGURE 3h illustrates a cleaned butterfly shrimp 61 comprising a longitudinally slit shrimp body 56 with the tail 58.

Shrimp cleaned and prepared in this manner are ordinarily frozen for subsequent use.

Shrimp are automatically cleaned and prepared in the manner described by the improved automatic shrimp cleaning machine illustrated in the drawings.

Again having reference to FIG. 3, a succession of shrimp 40 are supplied to the tail clamping zone or station 42 by conveyor means 62 to be described presently in greater detail. Each shrimp 40 is picked up at the tail clamping station 42 and carried through the successive operating zones 44 to 52 by a shrimp holding unit 64.

As shown, an annular array of six shrimp holding units 64 of identical construction are provided in the instant machine and supported in circumferentially spaced relation to each other by a rotor 66 mounted on the frame 67 of the machine as shown in FIGS. 4 and 10.

*Shrimp Holding Units*

The construction of an individual shrimp holding unit 64 is illustrated in FIGS. 15 to 19, and 32. As shown, each unit comprises a central support or frame 68 formed as a unitary casting and having a support flange 70 extending radially inward and supported on a pair of axially projecting bosses 72, projecting axially from the rotor 66 as shown in FIG. 18. The flange 70 is connected to the extreme ends of the bosses 72 by bolts 74 extending through the bosses 72.

As shown in FIGS. 16 and 17, the central support 68 of each holding unit 64 is shaped at its radially outward extremity to form a flange 76 defining an arcuate base or floor surface 78 of substantial width and having a length measured circumferentially equal to the length of the main body of the largest shrimp.

A pair of opposed tail clamping jaws 80 are pivotally mounted at the leading end of each holding unit 64 by means of a forwardly projecting pivotal support shaft 82 mounted in the center of the support 68, FIGS. 15 and 16. The jaws 80 project radially outward from the pivot 82 and define opposing tail clamping elements 84 located slightly forward of the leading edge of the floor surface 78 and a short distance radially outward from this surface as shown. A spring 86 coiled about the pivot 82 engages both jaws 80 to bias the tail clamping elements 84 toward engagement with each other.

A pair of short holding spikes 85 mounted in one of the clamping elements 84 in opposing relation to recesses 87 in the other clamping element provides added assurance against slipping of a shrimp tail from between the clamping elements.

For the purpose of swinging the tail clamping elements 84 away from each other in timed relation to rotary movement of the holding unit 64, a pair of cam followers 88 are affixed to the respective jaws to project radially inward in spaced relation to each other to coact with annular jaw controlling cams 90, FIGS. 7, 10, and 16, to be described presently.

A pair of shrimp body clamping jaws 92 are swingably mounted on a second pivot shaft 94 on the support 68. A pair of arcuate shell gripping flanges 96 formed on the radially outward edges of the respective jaws 92 oppose each other in adjacent outwardly spaced relation to the base surface 78, as shown. A spring 100 coiled about the shaft 94 engage the jaws 92 to urge the gripping flanges 96 toward each other.

As will presently appear, the two main gripping elements 96 operate to clamp against the relatively soft underside or belly of a shrimp 40 which is placed firmly against the base surface 78, as illustrated in phantom in FIG. 16. A firm grip on the lower portion of the shrimp shell 54 and the short appendages on the underside of the shell is obtained not only by the clamping force of the elements 96, but also by a series of circumferentially spaced holding spikes 102 affixed in the extreme marginal edge of each clamping element 96, as shown in FIGS. 15 and 19, for engagement with opposite sides of a shrimp body.

Even though the spikes 102 project directly toward the opposing jaws 96, they are prevented from engaging the opposing jaws by adjustable stops 104 on the jaws which engage abutment 106 on the support 68 to limit movement of the jaws toward each other.

For the purpose of automatically opening and closing the main clamping jaws 96 in timed relation to rotary movement of a clamping unit 64 through its closed path, a pair of cam followers 112 are affixed to the respective jaws 92 and extend radially inward for coaction with an opposed pair of annular control cams 114, FIGS. 7 and 16, to be described presently in greater detail.

It is particularly noteworthy that the leading ends of the main gripping flanges 96 stop circumferentially short of the trailing edges of the tail clamping elements 84, thus providing, FIG. 19, a substantial circumferential space 116 between the shrimp gripping portions of the elements 84 and 96.

This space 116 provides clearance for mounting on the leading end of the frame flange 76 a tail deflecting element 118 shaped and mounted on the flange 76, as shown in FIGS. 15, 16, 16a, and 19.

As will presently appear, the tail deflecting element 118 serves an important function in deflecting the intact tail 58 of a shrimp radially outward to clear the main body of the shrimp shell 54 as it is slipped longitudinally off the meat of the shrimp and past the shrimp tail 58 in the operating station or zone 52, FIG. 3.

Preferably the tail deflector 118 is formed as an integral part of a small casting 119, FIG. 32, which is secured by screws 120 to a flange 121 on the support 68, which projects forwardly of the floor surface 78. Situated in the space 116, between the trailing edges of the tail clamping jaws 84 and the forward end of the shrimp support flange 76, the tail deflector 118 projects radially outward beyond the floor surface 78 and is shaped to define an arcuate shrimp support and deflecting saddle surface 121. As viewed in transverse radial section, the saddle surface 121 has a concave shape as illustrated in FIGS. 19 and 32. As viewed in a circumferential section, i.e., along a plane perpendicular to the axis of the rotor, the saddle surface 121 has a convex arcuate shape which rises radially outward substantially from the forward end of the deflector to the rear end of the deflector.

At the forward end of the deflector 118, the bottom or trough of the saddle surface 121 is disposed a substantial distance rearwardly of the tail clamping jaws 84 and is located a slight distance radially inward of the radially outward extremity of the tail clamping jaws. From this forward end, the trough of the saddle surface 121 rises progressively to the rear end of the deflector, where the saddle surface is only slightly above the opposed shrimp gripping spikes 102, in the main jaws 96. The forward edges of the opposed jaws 96 are tapered radially to lie radially inward of the trailing end of the tail deflector 118.

It has been found that a tail deflecting element 118 approximately three-eighths of an inch wide and rising over-all approximately one-quarter inch from the base surface 78 while extending circumferentially approximately one-half inch provides a very satisfactory tail deflecting action when the saddle surface lies approximately three-sixteenths of an inch radially outward of the base surface 78. The leading end of the deflector 118, in the preferred construction, terminates approximately one-eighth of an inch circumferentially short of the trailing ends of the tail clamps 84.

To prevent the tail of the shrimp from extending too far radially inward with respect to the tail clamping jaws 84, tail positioning protuberance 124 is formed on the casting 119, FIG. 32, to project forwardly in underlying spaced relation to the jaws 84, as shown in FIG. 16.

Each shrimp holding unit 64 carries a pair of opposed tail shattering or rupturing jaws 126 for shattering or rupturing a section of the shrimp shell 54 just ahead (with respect to the shrimp) of the shrimp tail 58, as the shrimp is carried through the shell shattering station 46 previously described in relation to FIG. 3.

As best shown in FIGS. 5 and 17, the inner ends of the shattering jaws 126 are supported by pivots 128 on the radially inward marginal edges of the main clamping jaws 92 near the leading ends of the main jaws.

The two shattering jaws 126 are biased away from each other by coiled springs 129, supported within the respective main jaws 92 to act outwardly against the respective shattering jaws, as shown in FIGS. 17 and 18. Outward movement of the jaws 126 is limited by a pair of stop plates 130 fixed to the main jaws 92 in bridging relation to intermediate portions of the shattering jaws, as shown in FIGS. 15 and 18.

Movement of the tail shattering jaws 126 toward each other is effected by two bulbous sheet metal cam followers 132 fixed to the respective jaws, as shown in FIGS. 15 and 17, to be carried by the latter between a pair of opposed cam actuators 134, FIGS. 7 and 22, as the holding unit 64 passes through the tail shattering station 46, FIG. 3.

As shown in FIGS. 15 and 18, the radially projecting free ends of the shattering jaws 126 are turned toward each other across the leading ends of the main jaws 92. The opposing ends of the jaws 126 are spaced a short distance radially outward of the main gripping elements 96, as shown in FIGS. 15 to 18 and 33.

A shoe 137 secured to the extreme end of each jaw 126 supports a slightly discontinuous annular array of shell shattering spikes 136 which project toward a similar annular array of spikes in the opposing jaw. Preferably, the shoe 135 on one jaw supports six spikes 136, and the shoe 137 on the other jaw supports seven spikes 136. The spikes 136 on each shoe 137 are evenly spaced from each other, except for the two spikes nearest the adjacent main clamping element 96, which have a spacing exceeding that between the other spikes.

The ends of the spikes 136 are pointed, and quite sharp. The spikes on each jaw are positioned in relation to the spikes on the opposing jaw so that the pointed ends of opposing spikes do not engage each other upon closing of the jaws. Preferably, the outer diameter of the annular array or series of spikes 136 on each jaw is approximately five-sixteenths of an inch.

The spikes 136 on the two opposing jaws 126 are positioned circumferentially with respect to the holder 64 to lie radially outward of the shrimp deflecting element 118 so that the major portion of the spikes 136 are located forwardly of the rear end of the deflector.

As will presently appear, the opposed spikes 136 are capable of shuttering an intervening section 135, FIGS. 35 and 39, of a shrimp shell 54 without severing the tail 58 from the main body of the shrimp, FIGS. 3b, 23 to 26 and 35. Thus, as will presently appear, the section 135 of a shrimp shell 54 impaled and shattered on opposite sides of the spikes 136 is broken up in a manner which provides for easy removal of the main portion of the shell from the meat 56, and from the tail 58, which is left intact and attached to the shrimp meat, as previously mentioned.

Clogging of the spaces between the shell shattering spikes 136 on each jaw 126 is positively precluded by the action of a spike clearing plunger 139 mounted within the coacting support shoe 137 for reciprocation within the space encircled by the associated series of spikes 136. Normally, the clearing plunger 139 projects outwardly substantially to the free ends of the adjacent spikes, as shown in FIG. 34. The opposite end of the plunger 139 projects through the rear of the shoe 137 where the plunger acts on a coiled compression spring 141 supported within a spring housing 143 supported on the structure of the coacting jaw 126.

Upon swinging of the jaws 126 toward each other, causing the spikes 136 to impale a shrimp shell, the plungers 139 are forced inwardly by engagement with the shrimp shell, as shown in FIG. 35. Upon subsequent retraction of the jaws 126, the plungers 139 are forced outwardly by the springs 141 to dislodge any shell structure which might otherwise be caught between the spikes. Consequently, the spikes will remain clean and unfouled to operate with maximum efficiency for an unlimited period of time.

Main Rotor Assembly and Drive Therefor

As previously mentioned, each of the six holding units 64 is supported by a pair of axially extending bosses 72 on a rotor 66, FIG. 18, which is journaled on a horizontal shaft 140 supported on upright members 142, 144 of the frame 67, FIGS. 4 and 10.

The rotor 66 is turned at a steady speed by a driving train which, as shown, comprises an electric motor 146, FIG. 6, belted to a main power shaft 148 which is connected by a belt 150 to a speed reducer 152, FIGS. 4 and 6. An output shaft 154 of the speed reducer 152, FIGS. 6 and 8, carries a driving pinion 156 which meshes with a bull gear 158 on the periphery of the rotor 66.

Synchronization of the working parts of the machine is maintained by driving its mechanisms in timed relation to rotary movement of the rotor 66.

As shown in FIG. 10, the rotor bosses 72 which support the holding units 64 project to the left in radially spaced relation to an opposed pair of cam discs 160, 162 fixed to the shaft 140 which journals the rotor. The opposed peripheral edges of the cam discs 160, 162 are formed to define the previously mentioned pairs of concentric annular cams 90, 114 which actuate respectively the tail clamping jaws 80 and the main clamping jaws 92 of the respective holding units 64.

The cams 90 are mirror images of each other and are located radially outward of the cams 114, FIGS. 7 and 10, which are also formed as mirror images of each other.

The shaping of the cams 90, 114, which is significant here, is best illustrated with reference to FIG. 7.

With reference to FIG. 7, each holding unit 64 moves in a counter-clockwise direction with reference to the cams 90 and 114. Each cam 90 has a single axially raised portion 164, shown in section in FIG. 7, which extends in the direction of rotation of the holding unit 64 from a starting point located just ahead, circumferentially, of the shell separating station 52 to a trailing end terminating in alinement with the tail clamping station or zone 42.

Thus, as each holding unit 64 moves to the shell stripping station 52, the opposing raised portions 164 of the cams 90 move the cam followers 88 on the gripping unit toward each other to swing apart the tail gripping elements 84 to release the intact tail 58 of the shrimp, as will be presently referred to in greater detail. The raised cam portions 164 continue to hold the tail gripping elements 84 in spaced relation to each other as the gripping unit 64 progresses into alignment with the tail gripping station 42 where the raised cam elements 164 recede, allowing the spring 86 on the gripping unit to swing the gripping elements 84 into gripping relation to the tail of the shrimp supplied to the holding unit in a manner to be presently described. In this manner, the opening and closing of the tail clamping jaws 80 of each individual holding unit 64 is effected automatically as an incident to rotation of the holding unit through its closed course, the tail clamping action being effected at the tail clamping station 42 and released at the shell stripping station 52.

Each of the cams 114 includes an axially raised circumferential portion 166, FIG. 7, having a leading end located downwardly from the shell stripping station 52 with respect to the direction of rotation of the gripping units 64 to swing the cam followers 112 of each gripping unit 64 toward each other and release the shrimp shell 54 from the holding unit after it has progressed beyond the stripping station 52 to a shell discarding zone 168, FIG. 7.

The cam portions 166 continue in the direction of rotation of the holding units 64 into alinement with the main clamping zone 44 where the cam portions 166 recede to allow the spring 100 to close the main clamping elements 96 of the underbelly of a shrimp in a manner to be described presently in greater detail. In this manner, the main clamping jaws 92 of each holding unit 64 are also operated automatically as an incident to turning of the rotor 66.

Provision is made for adjusting the positions along the rotary path of the gripping units 64 at which the automatic operation of the clamping jaws is effected. For this purpose, the cam discs 160, 162 are adjusted rotatably by means of a radial adjusting arm 167, FIGS. 4 and 10, fixed to one end of the shaft 140, which is nonrotatably connected to the cam discs.

Shrimp Supply Conveyor

A succession of shrimp 40 are fed to the tail clamping zone 42, FIG. 7, in timed relation to movement of the holding units 64 into the tail clamping zone, by the continuous conveyor 62, previously mentioned, which is driven in timed relation to the rotor 66.

As illustrated in FIGS. 1, 2 and 12, the conveyor 62 comprises a continuous chain belt 170 trained around suitable sprockets 172 to have a horizontal run 174, FIG. 1, extending horizontally across the front of the machine from a shrimp loading station 176 in front of the machine, FIG. 12, to the feeding or tail clamping station 42.

The conveyor chain belt 170 supports a series of trays 178 which are carried in a horizontal position by the horizontal belt run 174. The shrimps 40 are loaded into the successive trays 178 at the loading station 176 by automatically tripped loading means 180, FIGS. 5, 12 and 13, to be described presently.

Each shrimp 40 is deposited in its supporting tray 176 so that the tail of the shrimp projects from an open end of the tray a predetermined degree toward the tail clamping or pick-up station 42, whereby upon movement of the shrimp to the tail clamping station the tail of the shrimp will project outwardly and downwardly between the open tail clamping elements 84 of one of the holding units 64.

The means provided for indexing the conveyor 62 in timed relation to turning movement of the rotor 66 comprises a six-pointed star or indexing wheel 182, FIGS. 4 and 10, mounted on the rotor 66 inwardly of the bull gear 158 by adjusting means which provides for limited rotary adjustment of wheel 182 relative to the rotor. A peripheral flange on the wheel 182 forms six generally radial ledges 184, FIG. 4, extending to six adjacent points 186 evenly spaced from each other around the axis of the wheel.

The star wheel ledges 184 move successively into engagement with a follower formed by a lug 188, FIGS. 4 and 10, projecting horizontally from a vertical sleeve 190 carrying a vertical rack 192 and supported by a vertical plunger 194 slidably mounted on the frame element 144. The plunger 194 and rack 192 are urged downwardly by spring 196.

As the star wheel 182 rotates counter-clockwise with reference to FIG. 4, each successive ledge surface 184 engages the follower 188, lifting it to an extreme vertical position at which it passes over the adjacent star wheel point 186, allowing the spring 196 to move the rack 192 and follower 188 back down to a lower position where the follower is engaged by the next successive star wheel ledge.

The rack 192 meshes with a pinion 198, FIGS. 4, 20 and 21, which is oscillated by reciprocation of the rack.

Oscillation of the pinion 198 is transformed into indexing movement on the conveyor 62 by the ratchet drive, shown in FIGS. 4, 20 and 21, and comprising two ratchet pawls 200 mounted for rotation with the pinion 198 and biased axially into engagement with a circular ratchet element 202 defining six circumferentially spaced arcuate detent grooves or notches 204. The notches 204 are adapted to receive and coact with the pawls 200 to index the element 202 rotatably in only one direction as an incident to oscillation of the pinion 198.

The driven element 202 is integral with one of the sprocket wheels 172, which carries and drives the conveyor chain belt 170.

The arrangement of the parts is such that the conveyor driving element 202 is advanced by the spring biased downward movement of the rack 192, which proceeds quickly in relation to the rotary speed of the star wheel 182. During the time required for the next ledge 184 to lift the rack 192 back to its extreme vertical position, the conveyor 62 remains immovable in its indexed position providing a time delay during which the shrimp 40 supported by the conveyor in alinement with the tail clamping station 42 can be clamped by the tail by a holding unit 64, as described.

*Conveyor Loader*

Efficient loading of shrimp 40 into the conveyor 62 is provided by the previously mentioned loading structure 180 which is adjustable to vary the length of the tail 58 that is left intact on the cleaned body of each shrimp.

As shown in FIGS. 1 and 2, shrimps are supplied from a hopper 206 above the machine onto a downwardly and forwardly inclined pick-up board 207 where an attendant for the machine picks up the shrimps and places them in the loading structure 180, which is automatically tripped in timed relation to movement of the conveyor 62.

The loading structure 180 comprises a battery of six parallel loading trays 208, FIGS. 1, 3, 5 and 12, overlying the horizontal run of conveyor trays 178 in parallel relation to the conveyor trays and extending rearwardly of the conveyor trays, as shown in FIG. 5.

The work of the attendant is limited to the simple operation of picking up the shrimps 40 from the supply board 207 and placing the shrimps in the loading trays 208 so that the tails on the shrimp extend rearwardly into engagement with a series of stops 210 at the rear ends of the trays 208, FIGS. 13 and 14.

Each loading tray 208 is formed by a pair of longitudinal side plates 212, FIGS. 12, 13, and 14 mounted on a pair of rotary support shafts 214 journaled on a generally horizontal frame 216. Operating gears 218 fixed to the respective shafts 214 are interconnected with a horizontal actuating rack 220, FIGS. 10 and 12, in such fashion that horizontal movement of the rack 220 between two extreme positions swings each pair of loading tray plates 212 between the normal positions shown in FIG. 12, in which the plates 212 converge downwardly toward each other to form a loading tray 208, and a conveyor loading or shrimp depositing position in which the pairs of plates 212 are swung apart into parallel relation to each other to deposit the shrimp 40 previously loaded into the loading trays 208 into six conveyor trays 178 underlying the respective loading trays.

The rack 220 is moved horizontally into shrimp depositing position and back to normal position in timed relation to rotation of the rotor 66 through successive and complete turns.

As shown in FIGS. 10 and 12, a gear element 222 connects the horizontal rack 220 with a vertical rack 224 which is urged downwardly by a spring 226. An actuating lug 228, FIG. 10, on the rack 224 projects horizontally into the path of a single actuator 230 carried by the rotor 66 and extending across the cam discs 160, 162 as shown in FIG. 10. Once during each revolution of the rotor 66, the actuator 230 engages the follower 228 and lifts the rack 224 temporarily to a raised position for depositing six shrimp in the conveyor 62, as described.

The previously mentioned adjustable stops 210 at the rear of the loading trays 208 are supported on a slide 232, FIGS. 13 and 14, mounted on the frame 216 for adjustment longitudinally with respect to the loading trays. As mentioned, the loading trays 208 project rearwardly of the underlying conveyor trays 178 so that tails of the shrimp deposited in the conveyor trays project rearwardly and downwardly from the rear ends of the latter. The longitudinal position of the shrimps 40 in the loading trays 208 and, hence, the extent to which the shrimp tails project rearwardly from the conveyor trays 178 is determined by adjustment of the stops 210, as explained.

*Structure and Operation of the Tail Clamping and Body Clamping Stations*

The functions performed at the tail clamping station 42 have been referred to in considerable detail. The tail clamping elements 84 move into this station in spaced relation to each other by virtue of the action of the raised cam portions 164, FIG. 7. The tail 58 of the shrimp 40 resting in a conveyor tray 178 alined with the tail clamping station extends down between the tail clamping elements 84, FIG. 7, to rest on the part 124, FIG. 16, where the tail is clamped by movement of the elements 84 toward each other as the cam followers 88 move off the raised cam portions 164. As a gripping unit 64 moves on to the body clamping station 44, the raised cam portions 114 continue to hold the body clamping elements 96 spaced apart so that the underbelly of the shrimp 40 can rest on the curved floor surface 78 of the gripping unit. Two grooved pressure rollers 240, 242 supported at the body clamping station 44 by resilient supports 244, 246, FIGS. 3, 5 and 7, engage the back of each shrimp 40 as it moves into the body clamping station 44 to force the underbelly of the shrimp down against the floor surface 78, as shown in FIG. 3a.

Transverse alinement of each shrimp 40 with the open space between the main clamping elements 96 is assured as each shrimp goes into the body clamping station by a pair of resilient alining blades 248 mounted on a support 260, as shown in FIGS. 5 and 7, to engage opposite sides of the shrimp as it moves between the tail clamping station and the body clamping station.

At the body clamping station 44, the cam followers 112 move off the raised cam portions 114, allowing the main clamp elements 96 to firmly grip the underside of the shrimp shell 54, as shown in FIG. 3a, a positive grip on the shell being assured by previously mentioned spikes 102 and 106, FIG. 19.

*Structure and Operation of Shell Shattering Station*

Immediately beyond the body clamping station 44, the resilient cam followers 132 on the shell shattering jaws 126, FIG. 17, pass through a constriction formed by the two opposed cams 134, FIGS. 7 and 22, mounted on a support 252, as shown. This swings the jaws 126 together, causing the spikes 136 to impale and shatter the shrimp shell 54 ahead of the tail 58.

*Structure and Operation of Shell Ripping and Deveining Station*

At the shell ripping and deveining station 48, the shrimp shell 54 is longitudinally ripped open along the back of the shrimp and the sand vein removed by a rotary ripping disc 254, FIGS. 7, 23, 24 and 27, defining a circumferential series of shell ripping and deveining teeth 256, FIG. 23, pitched in the direction of rotation of the ripping disc. As indicated by the arrow 258 in FIG. 23, the ripper 254 rotates in the clockwise direction with reference to FIGS. 3 and 23, moving the teeth 256 relative to a shrimp 40 toward the tail 58 of the shrimp which is left intact.

An arcuate guard 260 mounted on opposite sides of the ripping disc 254 radially inward of the teeth 256 serves to limit the depth of cut of the ripper into the meat of shrimp in removing the sand vein.

The ripper disc 254 is powered and operated in a manner which lifts the ripper over the tail 58 of each shrimp to engage the shrimp body ahead of the tail.

For this purpose, the ripper disc 254 is mounted on a shaft 262, FIGS. 6, 7 and 27, journaled in a sleeve 264 supported by the projecting end of an arm 266 swingably mounted, as shown in FIGS. 6 and 22, on the main power shaft 148 previously mentioned. A pulley wheel 268 on the shaft 148 is connected by a belt 270, FIG. 6, to a pulley 72 which drives the shell ripper shaft 262. The arm 266 is biased to swing the ripper disc 254 toward a shrimp in the ripping station 48 by an outboard weight 274 mounted on the arm 266, as shown in FIGS. 7, 22 and 27.

As the tail 58 of the shrimp 40 approaches the shell ripping disc 254, the ripping disc is moved radially outward from its normal position to clear the shrimp tail, as shown in FIG. 23, by automatic control means operated by rotation of the rotor 66. Thus, as shown in FIGS. 22 and 27, a cam follower 276 mounted on the swingable arm 266 extends into engagement with a suitable cam 278 pivotally mounted on a frame member 280 and serving as a means for adjusting the normal position of the ripping disc radially with respect to the path of shrimp 40 carried by the holding units 64. The arm supported follower 276 tends to urge the cam 278 counterclockwise about its support pivot 282 to engage the cam with an adjustable limit stop 284 which determines the normal position of the ripping disc.

A series of six circumferentially spaced cam actuating bars 286, fixed to and projecting axially from the frames 68 of the respective gripping units 64, are moved successively into engagement with the projecting end of the cam 278, as shown in FIG. 27, in timed relation to movement of the successive shrimp tails 58 into alignment with the ripper 254 to swing the cam 278 and the arm 266 clockwise to move the ripper 254 radially outward to clear the shrimp tails, as described. As each bar 286 clears the cam 278, the cam releases the ripper 254 to swing into its normal position to rip open the shrimp shell and dig out the sand vein, as illustrated in FIG. 24.

Each shrimp 40 is laterally centered with respect to the ripping disc 254 as it moves into the disc by a pair of converging guiding blades 287 mounted on support structure 289, FIGS. 7 and 22, to engage opposite sides of the shrimp.

The spinal area of a shrimp 40 is flushed by a jet of water played by a nozzle 290 into the back of each shrimp as it emerges from the station 48, FIG. 7.

*Structure and Operation of the Shrimp Cleaning and Slitting Station*

At the station 50, each shrimp 40 is thoroughly cleaned to assure complete removal of debris from the area of the situs of the sand vein. Moreover, each shrimp being cleaned in this station is optionally slit open longitudinally to a depth far below the situs of the sand vein to form a cleaned butterfly shrimp.

Upon entering the station 50, each shrimp 40 is engaged along its dorsal side by a pressure spreading roller 291. The roller presses firmly against the exposed flesh of the shrimp to spread apart the body portions located on opposite sides of the longitudinal area from which the sand vein is dug out in the station 48. The structure which supports and operates the pressure roller 291 in timed relation to rotation of the rotor 66 will be described presently.

Each shrimp 40, spread open by the pressure roller 291, moves immediately into coacting relation to a debris removing rake 293, FIGS. 7, and 36 to 38.

The rake 293 is formed by a plurality of thin, generally horizontal blades 295 swingably supported on a common pivot 297. The pivot 297 is located between the centers of gravity of the blades 295 and the shrimp engaging ends of the blades, so that the blades are biased in counterclockwise directions with respect to FIGS. 7 and 36 by the weight of the blades. The ends of the blades 295 remote from the passing shrimp are normally supported by a stop arm 299 projecting from adjacent structure of the frame 67.

At the common pivot 297, the blades 295 are spaced from each other by intervening washers 301 in a manner such that the blades are held apart throughout substantially their entire length to avoid frictional engagement of the blades with each other. This leaves the individual blades free to tip in a clockwise direction, FIG. 36, upon engagement with a passing shrimp 40.

All the blades 295 converge toward each other in the direction of a passing shrimp 40, so that the ends of the blades which engage the shrimp are substantially touching.

In this instance, a total of six raking blades 295 are used. The combined thickness of all the blades at the shrimp end of the blades is sufficient to assure spanning of the longitudinal area of a passing shrimp from which the sand vein has been dug out in the station 48.

Upon coming in contact with the blades 295, the shrimp is still spread open from its having been engaged by the pressure roller 291. The flesh of the shrimp engages the individual blades 295, causing the blades to tip in a clockwise direction to avoid gouging of the shrimp flesh. At the same time, the biasing action of gravity on the blades holds them in engagement with the shrimp with sufficient pressure to effectively rake away any debris left from the previous sand vein removing operation. If desired, a jet of cleansing water can be caused to play upon each shrimp as it moves past the rake 293.

The pressure spreading roller 291 is formed in two separable half-sections. In those instances in which it is desired to slit open the shrimp to form butterfly shrimp, as described, a shrimp slitting disk or blade 291 is inserted between the two half-sections of the spreading roller 291, as shown in FIGS. 3d, 25 and 26.

The spreading roller 291 and the slitting disk 292 are supported and powered by means which causes the disk 292 to pass over the intact tail 58 of each passing shrimp 40 and engage and slit open the main body of the shrimp joined to the tail.

As shown in FIGS. 6, 8 and 9, the roller 291 and slitting disk 292 are supported on a sleeve 296 journalled on an axle carried by the projecting end of one arm of a bell-crank 300. The bell-crank 300 is swingably supported on a stationary axle 302. The slitting disk 292 and roller 291 are powered by means of a sprocket chain 304, FIGS. 6 and 8, connecting the output shaft 154 on the speed reducer 152 to a gear 306 on the axle 302. The gear 306 meshes with a gear 310, FIG. 8, which is connected by a second sprocket chain 312 with a sprocket wheel 314, FIG. 9, that drives the sleeve 296 to rotate the pressure roller 291 and slitting disk 292.

Normally, the pressure roller 291 and slitting disk 292 occupy positions which are spaced radially outward from the path of the passing shrimp 40.

As located in its normal position, the disk 292 clears the intact tails 58 of the passing shrimp. To slit the bodies of the successive shrimp moving into the station 50, the slitting disk 292 is moved radially inward from its normal position by means of a cam following roller 318 journalled on the other end of the bell-crank 300 to engage a circumferentially spaced series of cams carried by the rotor 66, as shown in FIG. 8. One cam 320 is provided fo reach shrimp holder 64. Each cam thus provided moves the slitting disk 292 and roller 291 inward to their body slitting and spreading positions, as shown in FIG. 26, while the main body of the shrimp is passing through the station 50.

If it is not desired to slit the shrimp longitudinally to form butterfly shrimp, the shrimp spreading roller in the station 50 can be supported and operated by a modified construction illustrated in FIG. 31. For simplicity in description, component elements of this modified construction similar to structural elements previously described are identified by the same reference numbers, with the addition of the suffix "a."

In this form, the bell-crank 300a is normally biased in a direction to urge the roller 291a toward the axis of the rotor 66. This is effected by means of a counterweight 311 supported on the bell-crank 300a, to urge the latter to a normal position determined by engagement of a part 313 on the lever with an adjustable stop 315. In this instance a pressure roller 291a rolls harmlessly across the intact tail of the shrimp to spread the body of the shrimp in the manner described.

*Structure and Operation of Shell Removing Station*

At the shell removing station 52, rotary movement of the main body 56 of each shrimp 40 and its intact tail 58 is terminated while rotary movement of the main body of the shrimp shell 59 continues to separate the shell from the shrimp body by longitudinal movement of the shell along the body past the intact tail 58.

For this purpose, a pattern of shrimp meat impaling spikes 322 is fixed in a horizontal support bar 324, as shown in FIGS. 3e, 6, 7, 11 and 40, to project upwardly in underlying relation to a shrimp 40 when the latter reaches the shell stripping station 52. As shown best in FIGS. 6, 27 and 29, the pattern of spikes 322 has the general form of an arrow, and comprises a straight row of four spikes for impaling the main body of the shrimp and a triangular group 322a of three spikes spaced somewhat from the four spikes and adapted to engage the tail of the shrimp to assure retention of each shrimp tail in position to remain attached to the flesh of the body of the shrimp.

The bar 324 is shifted upwardly with a quick movement to impale the body and tail of the shrimp with the spikes 322 and stop movement of the impaled structure as the main clamping elements 96, FIG. 3, carry the shrimp shell on past the shrimp tail 58. It will be recalled that the tail clamping elements 84 are released at the shell stripping station 52 by the raised cam portions 164, FIG. 7.

As the shrimp shell is moved longitudinally off the shrimp body, the previously described tail deflecting element 118 of the coacting holding unit 64, FIGS. 16 and 16a, cams the intact shrimp tail 58 radially outward past the underbelly of the shrimp shell 54 so that the shell does not engage and pull off the shrimp tail.

The separated shell 54 is carried on over to the shell discarding station 168 where the raised cam portions 166, FIG. 7, separate the main clamping elements 96 to release the shrimp shell, as described.

The spikes 322 and the impaled shrimp body are retracted by downward movement of the bar 324 which pulls the spikes through an arcuate stripper plate 326, FIGS. 3e and 11, which removes the cleaned butterfly shrimp from the spikes.

As shown in FIG. 11, the horizontal bar 324 extends through the bifurcated end of a pivoted bell crank 328, the other end of which carries sweep bar 330 which is swung across the stripper plate 336, as shown in FIGS. 3e, 3f, and 3g, to slide the cleaned shrimp 61 into a suitable repository.

Thus, the entire operation of removing a cleaned shrimp from its shell 54 is effected in response to vertical reciprocation of the horizontal bar 324 in synchronization with rotation of the rotor 66.

Quick movement of the bar 324 is accomplished by means of a vertical actuating rod 332 connected to the bar 324, as shown in FIG. 11, by suitable connecting and guide means 334. The actuating rod 332 is biased upwardly, as shown in FIG. 4, by a spring 336 and carries at its upper end a cam follower 338, FIGS. 4 and 6, opposing a rotary cam 340 shaped as shown in FIG. 4. The cam 340 is connected through a shaft 342, FIG. 6, with a gear 344 which, as shown in FIGS. 4, 5 and 6, meshes with a gear 346 connected to a driven pinion 348 meshing with the bull gear 158 on the rotor 66. The shape of the cam 340 is designed, as shown, to coact with the spring 336 to effect the desired timing and vertical movement of the interconnected shrimp impaling spikes 322.

To assure a proper lateral positioning of each shrimp 40 relative to the impaling spikes 322 as the shrimp passes through the shell removing station 52, a wedge-shaped frog 350 is mounted between the cam discs 160, 162, as shown in FIGS. 27 and 28, to be straddled by the cam followers 88 and 112 of each holding unit 64 moving into shell stripping position. Two opposed leaf springs 352 extend from the back side of the frog in the direction of rotation of the holding units to bias the opposed cam followers away from each other as they move past the frog. The action of the frog 350 and springs 352 assures a proper laterally centered position of the main clamping elements 96 and, hence, the supported shrimp 40, in respect to the spikes 322, as shown in FIG. 3e, as each holding unit 64 goes through the stripping station. Also, the spreading force of the springs 352 on the cam followers 112 intensifies the grip of the main clamping elements 96 on a shrimp shell as it is separated from the shrimp meat 56. The frog 350 and springs 352 also serve to prevent interference between the impaling spikes 322 and a gripping unit 64 in the event of breakage of the jaw operating springs in the gripping unit.

After releasing the stripped shrimp shell 54, as shown in FIGS. 3, 7 and 27, each holding unit 64 passes by a rotary cleaning brush 354, which, together with water sprays (not shown) cleans each holding unit 64 before it reaches the tail clamping station 42.

FIGURES 41 to 44 illustrate a modification of the machine which facilitates simplified manual loading of shrimp onto the conveyor 62a within the machine. For simplicity in description, component elements of this modified form of the machine which form counterparts of similar components in the machine previously described are identified with the same reference numbers, with the addition of the suffix "a."

Shrimp 40a to be cleaned are supplied to a manual loading station 400 at the top of the modified machine by means of a conveyor belt 402. The shrimp 40a are caused to move from the conveyor belt down an inclined slide panel 404 onto a horizontal loading ramp or support floor 406 located alongside the upper horizontal run of the conveyor 62a.

The shrimp 40a lie in random positions on the loading board 406 in positions which are relatively close to the passing conveyor 62a.

The modified conveyor 62a is structurally adapted to facilitate manual loading of the shrimp directly into parallel carrier trays 408 on the endless carrier chain 170a of the conveyor. The individual trays 408 are formed from sheet metal and shaped to define transverse trough portions 410 which are tapered longitudinally in the direction in which the individual shrimp are removed from the trays by the previously described shrimp holders 64 within the machine.

Thus, as shown each tray 408 has a flat bottom 412 which merges with two side-walls 414, 416 which extend upwardly in diverging relation to each other. The horizontal floor 412 of each tray narrows progressively toward the end of the tray from which the shrimp supported in the tray is subsequently removed. There is a corresponding narrowing of the spacing between the tray walls, 414, 416 toward the small end of the tray, so that the space within the tray conforms generally to the somewhat tapered shape of the shrimp.

This shaping of each tray is of advantage in causing a shrimp placed in the tray to occupy a centered position within the tray in which the shrimp belly is turned straight down and the back of the shrimp is positioned directly over the belly.

With reference to the drawings, individual shrimp are removed from the trays 408 in a rearward direction, which extends from left to right with reference to FIG. 42. The trays 408 taper in this rearward direction, as described. The loading board 406 is located slightly rearwardly of the trays 408 at substantially the same vertical level as the trays. The individual shrimp 40a are manually picked up from the loading board 406 and placed in the loading trays 408, so that the tails of the shrimp project rearwardly from the trays, as illustrated in FIG. 42.

Location of the shrimp in proper longitudinal positions within the trays 408 is facilitated by suitable coloring or a mark on the rear end of each tray which indicates the proper position of the first joint 420 of the shrimp shell with respect to the tray. This first joint 420 of an individual shrimp is indentified in FIGS. 39 and 42. As indicated, it is aligned with one edge of a marker strip 422 on the small end of each tray 408. This provides for proper longitudinal positioning of each shrimp with respect to the holders 64 which pick up the shrimp within the machine, as described.

Horizontal flanges 424, 426 formed on the upper edges of the respective walls 414, 416 of the trays 408 project toward corresponding flanges of adjacent trays to form a substantially continuous bridging of the space between the trays as they move through the manual loading zone. This positively precludes an operator's fingers from becoming caught between the trays.

While certain advantages are realized from use of the specific construction of the exemplary embodiments of the invention illustrated, it will be understood that the invention is not limited to use of the particular structures shown, but includes variants and alternatives within the spirit and scope of the invention as defined by the claims.

The invention is claimed as follows:

1. A shrimp cleaning machine comprising, in combination, rotor means mounting an annular series of gripping units for movement through a circular path, means for supplying shrimp tail first to a pickup station adjacent said path, each of said gripping units including shrimp gripping elements, means for operating said gripping elements of each unit to pick up and grip a shrimp as an incident to movement of the unit past said pickup station, each gripping unit including means for shattering the shell of a gripped shrimp just ahead of the tail of the shrimp, a shell ripping and deveining element located adjacent said path, means for shifting the position of said ripping and deveining element in timed relation to movement of said units thereby to bypass the tails and engage the dorsal sides of shrimp carried by the successive gripping units, a shrimp slitting element positioned adjacent the path of said gripping units, means for shifting said slitting element in timed relation to movement of said units thereby to bypass the tails and engage and longitudinally slit the main bodies of the shrimp carried by the successive gripping units, shrimp body impaling means mounted adjacent said path for impaling and stopping rotary movement of the bodies of the shrimp carried by said successive gripping units, and each gripping unit including a shrimp tail deflecting element thereon arranged to deflect the tail of a supported shrimp radially outward as an incident to termination of rotary movement of the body of the shrimp by said impaling means.

2. A shrimp cleaning machine comprising, in combination, an endless series of shrimp holding units mounted for circulation through a closed path in a predetermined direction; a tail gripping station, a shell gripping station, a shell rupturing station, a shell ripping and deveining station, a shrimp body slitting station, a shell removing station and a shell release station spaced from each other along said path; said shell gripping station being located between said tail gripping station and said shell rupturing station, said shell release station being located between said shell removing station and said tail gripping station, means for supplying a succession of shrimp tail first to said tail gripping station, each holding unit including tail gripping means for gripping the tail of a shrimp at said tail gripping station and moving the shrimp to said shell gripping station, each holding unit including shell gripping means for gripping the main portion of a shrimp shell at said shell gripping station, each holding unit including shell rupturing means positioned on the holding unit for engaging and rupturing the shell of a supported shrimp at a position longitudinally along the shrimp which is disposed at least partially beyond said shell gripping means in the direction of said tail gripping means of the unit, means for moving said rupturing means of each unit to rupture the shell of a supported shrimp as the unit moves through said shell rupturing station, means for releasing said rupturing means of each unit from a shrimp in the unit before the unit reaches said shell removing station, a shell ripping and deveining element located at said ripping and deveining station; means for operating the ripping and deveining element in timed relation to movement of the holding units thereby to skip over the tails and to engage, rip open and remove the sand veins from the bodies of the shrimp carried through said ripping and deveining station by the sucecssive holding units; a shrimp slitting element located at said slitting station, means for operating said slitting element in timed relation to movement of the holding units thereby to skip over the tails and engage and longitudinal slit the main bodies of the shrimp carried through said slitting station by the successive gripping units, means for releasing said tail gripping means of each holding unit before the unit reaches said shell removing station, shrimp body impaling means located at said shell removing station, means for operating said impaling means in timed relation to movement thereby of said holding units to impale and separate from the shrimp shells the bodies and the intact tails of successive shrimp moved into said shell removing station by the successive holding units, and means for effecting release of the shell gripping means of each holding unit as the unit passes through said shell release station.

3. In a shrimp cleaning machine, the combination of shrimp conveying means, means for loading shrimp onto said conveying means and including a plurality of shrimp holders transversely overlying said conveying means and extending beyond one side thereof, abutment means located at the ends of said respective holders at said one side of said conveying means and adapted to determine the posititon of shrimp placed in the holders with the tails thereof engaging the abutment means, means for adjusting said abutment means longitudinally with respect to said holders, means for operating said holders to deposit shrimp onto said conveying means to project from said one side thereof to a degree determined by the adjustment of said abutment means, means for operating said conveying means to move successive shrimp to a pickup station, a plurality of holding units; means mounting said holding units for movement through a path extending past said pickup station, a shrimp shell rupturing station, a deveining station, and a shell removing station; each holding unit including shrimp tail clamping elements operated as an incident to movement of the holding unit past said pickup station to grip the tail of a shrimp at said pickup station at a location along the shrimp determined by the degree to which the shrimp projects from said conveying means, shrimp shell rupturing means carried by each of said holding units, means for operating the shell rupturing means of each holding unit upon movement of the unit through said shell rupturing station to engage and rupture the shell of a supported shrimp adjacent the tail of the shrimp, means at said deveining station for deveining shrimp carried thereby, and means at said shell removing station for removing the bodies and intact tails from the shells of shrimp moved thereby.

4. In a shrimp cleaning machine; the combination of a plurality of shrimp holding units movable through a closed path extending past a pickup station, a deveining station, and a shell removing station; shrimp transfer means for supporting and moving a succession of shrimp into a pickup position in said pickup station determined by the position of the shrimp on the transfer means, power driving means for operating said shrimp holding units and said transfer means in synchronism, shrimp guide means coacting with said transfer means for determining the position in which shrimp are located on the transfer means, means for adjusting the position of said shrimp guide means for varying the position of shrimp on said transfer means to adjustably determine said pickup position in said pickup station at which the successive shrimp are supplied thereto, said shrimp holding units including means for gripping shrimp at said pickup station at a position along each individual shrimp determined by said pickup position into which shrimp are supplied in the pickup station, means at said deveining station for deveining shrimp moved thereby by said holding units, and means at said shell removing station for removing the bodies from the shells of shrimp moved thereby.

5. In a shrimp cleaning machine, a shrimp holding unit comprising, in combination, a pair of tail clamping elements opposing each other along a forward portion of the unit, a pair of main clamping elements opposing each other along a portion of the unit rearward of said tail clamping elements, a pair of shell shattering elements, each shell shattering element mounting a plurality of shrimp shell shattering spikes facing toward the other shattering element, said spikes being located somewhat rearwardly of said tail clamping elements and forwardly of the main portion of said main clamping elements to engage and shatter a portion of the shell of a shrimp gripped by said tail clamping elements and said main clamping elements, and means for moving said shattering elements toward each other to shatter the shell of a shrimp gripped by said tail clamping elements and said main clamping elements.

6. In a shrimp cleaning machine, a shrimp holding unit comprising, in combination, a frame defining a shrimp support surface, a pair of clamping elements opposing each other in immediate overlying relation to said surface for clamping the underbelly of a shrimp, a tail deflector element disposed just ahead of said main clamping elements and defining a rising tail deflecting surface extending rearwardly and outwardly to a trailing edge from a leading edge located forwardly and inwardly of said main clamping elements to shield the adjacent forward portions of said main clamping elements, and shell shattering elements opposing each other in general alinement with said tail deflecting element.

7. In a shrimp cleaning machine, a shrimp holding unit comprising, in combination, a frame defining a shrimp support floor surface, a pair of main clamping elements opposing each other in immediate overlying relation to said floor surface for clamping the underbelly of a shrimp, a tail deflector element mounted just ahead of said main clamping elements and defining a tail deflecting surface extending rearwardly and outwardly from a leading edge sufficiently to shield the adjacent forward portions of said main clamping elements, a pair of shrimp tail clamping elements opposing each other forwardly of said tail deflecting element for clamping the tail of a shrimp projecting forwardly of said deflecting element in overlying relation thereto, and a pair of shell shattering elements opposing each other in general alinement with said tail deflecting element to shatter a portion of the shell of a shrimp between said tail clamping elements and said main clamping elements.

8. In a shrimp cleaning machine, the combination of a plurality of holding units, means for moving said holding units in succession through a predetermined path, means for loading individual shrimp onto the successive holding units, each holding unit including shrimp gripping elements for gripping a shrimp rearwardly of the tail of the shrimp, means operated as an incident to movement of said holding units along said path for rupturing the shell of the shrimp supported by each holding unit between the tail of the shrimp and said gripping elements of the unit, means for deveining the individual shrimp carried by the successive holding units, means for engaging and stopping movement of the body of the shrimp supported by each successive holding unit while continuing movement of the unit along said path, and means on each holding unit for deflecting the tail of a shrimp thereon outwardly from said gripping elements of the unit as an incident to stopping movement of the shrimp body while continuing movement of the holding unit with the shrimp shell clamped between said gripping elements of the unit.

9. In a shrimp cleaning machine, the combination of a plurality of holding units, means for moving said holding units through a predetermined path, means for supplying shrimp to the holding units, each holding unit including means for gripping a shrimp rearwardly of the tail of the shrimp, means operated during movement of said holding units along said path for rupturing the shell of the shrimp supported by each holding unit, means for deveining the individual shrimp carried by the successive holding units, means for removing from the shell the body of the shrimp supported by each successive holding unit during movement of the latter along said path, and means on each holding unit for deflecting the tail of a shrimp thereon outwardly as an incident to removing the body of the shrimp carried by the unit.

10. In a shrimp cleaning machine, the combination of a plurality of holding units; means for moving said holding units through a predetermined path extending past a pickup station, a deveining station, and a shell removing station; means for supplying shrimp to said pickup station, each holding unit including means for picking up a shrimp from said pickup station and gripping the shrimp by the shell thereof as an incident to movement of the gripping unit past said pickup station, means at said deveining station for removing the sand vein from the bodies of shrimp moved thereby by said holding units, a stripper element supported at said shell removing station and defining a curved shrimp stripper face confronting the adjacent portion of said path and having an over-all curvature conforming generally in shape to a cylindrical surface segment, a spike support element, a plurality of shrimp body impaling spikes mounted on said support element to project through said stripper element toward the adjacent path of shrimp carried by said holding units, actuating means for operating said spike support element in timed relation to movement of said holding units to quickly jab said spikes into the body of each shrimp moved into said shell removing station by each successive holding unit and to subsequently retract said spikes through said curved stripper face to remove the shrimp body from the spikes; a sweep pivotally supported about a pivot axis, which substantially coincides with the axis of curvature of said stripper face, for swinging movement over said stripper face to clear a shrimp body therefrom, and said actuating means including means for operating said sweep as an incident to retraction of said spikes.

11. In a shrimp cleaning machine, the combination of a plurality of shrimp holding units movable through a predetermined path, means for supplying shrimp to successive holding units moving along said path, means for deveining shrimp carried along said path by said units, a curved stripper plate mounted alongside said path at a shell removing station and defining a curved stripper surface confronting said path and shaped generally as a cylindrical surface segment, a spike support, an elongated series of spikes mounted on said support and projecting through said stripper plate toward said shell removing station, a reciprocable actuator connected to said spike support and operated in timed relation to movement of said holding units to quickly advance the spikes toward said shell removing station to impale the body of a shrimp therein and for subsequently retracting the spikes through said stripper plate, a bell crank medially pivoted for swinging movement about an axis which substantially coincides with the axis of curvature of said stripper surface, means for transmitting motion of said reciprocable actuator to one end of said bell crank for swinging the bell crank, and a sweep connected to the other end of said bell crank for movement along said stripper surface as an incident to retraction of said spikes through said stripper plate.

12. In a shrimp cleaning machine, the combination of a plurality of shrimp holding units movable in a predetermined direction through a closed path, means for supplying a succession of shrimp to successive holding units for movement tail first along said path by the holding units, means for deveining shrimp carried along said path by said units, a spike support mounted in alignment with a shell removing station in said path, a series of spikes mounted on said spike support and extending toward said shell removing station in a substantially straight line parallel to the adjacent portion of said path, two spikes mounted on said spike support and extending toward said shell removing station in positions located on opposite sides of said straight line and disposed adjacent the downward end thereof with respect to the direction in which the holding units move through said shell removing station, and means for operating said spike support in timed relation to movement of said holding units to quickly advance said spikes toward said shell removing station to engage the body and tail of a shrimp therein to stop movement thereof along said path and for retracting said spikes to withdraw the impaled shrimp body and tail from said path.

13. In a shrimp cleaning machine, the combination of a plurality of shrimp holding units; means for moving said units through a closed path extending past a pickup station, a shell shattering station, a deveining station, a cleaning station, and a shell removing station; each holding unit including opposed shrimp gripping elements and opposed shell shattering elements, each shell shattering element defining a plurality of shell shattering protuberances projecting toward the other shattering element, a depressible protuberance clearing element mounted in each shattering element adjacent said protuberances thereon and spring biased to clear foreign material from said protuberances, means for operating said gripping elements of said respective units to pick up and clamp shrimp supplied to said pickup station, means for moving said shell shattering elements of said respective units toward each other as an incident to movement of the units through said shell shattering station to shatter portions of the shells of shrimp carried by the respective units, means at said deveining station for deveining the bodies of shrimp moved through the deveining station by said units, pressure spreading means at said cleaning station for engaging and spreading the dorsal sides of shrimp moved into said cleaning station, mechanical raking means in said cleaning station including a plurality of juxtaposed pivoted raking elements positioned to engage and yieldably rake the spread open dorsal areas of shrimp moving through said cleaning station from said pressure spreading means, and means at said shell removing station for taking the bodies from the shells of shrimp moved into said shell removing station.

14. In a shrimp cleaning machine, the combination of a plurality of shrimp holding units; means for moving said units through a closed path extending past a pickup station, a deveining station, a cleaning station, and a shell removing station; each holding unit including opposed shrimp gripping elements, means for operating said gripping elements of said respective units to pick up and clamp shrimp supplied to said pickup station, means at said deveining station for deveining the bodies of shrimp moved through the deveining station by said units, pressure spreading means at said cleaning station for engaging and spreading the dorsal sides of shrimp moved into said cleaning station, mechanical raking means in said cleaning station including a plurality of juxtaposed raking elements positioned to engage and yieldably rake the spread open dorsal areas of shrimp moving through said cleaning station from said pressure spreading means, and means for separating the bodies from the shells of shrimp moved into said shell removing station.

15. In a shrimp cleaning machine, a movable shrimp holding unit comprising, in combination, means defining a longitudinal floor surface, a pair of main clamping elements opposing each other in immediate overlying relation to said floor surface for clamping the underbelly of a shrimp, a tail deflector element mounted just ahead of said main clamping elements and defining a tail deflecting surface shaped to extend rearwardly and outwardly from the front of the tail deflector element sufficiently to shield the adjacent forward portions of said main clamping elements, a pair of shrimp tail clamping elements opposing each other forwardly of said tail deflecting element for clamping the tail of a shrimp projecting forwardly over said deflecting surface, a pair of shell rupturing elements opposing each other in general alignment with said tail deflecting element to rupture a portion of the shell of a shrimp between said tail clamping elements and said main clamping elements.

16. In a shrimp cleaning machine, the combination of a plurality of shrimp holding units; means supporting said units for movement in succession through a path extending past a shrimp pickup station, a deveining station, a shrimp cleaning station, and a shell removing station; each holding unit including shrimp clamping elements, means for operating said clamping elements of each unit as an incident to movement of the unit past the pickup station to clamp a shrimp in the holding unit, a shrimp deveining element at said deveining station, means for operating said deveining element in timed relation to movement of said holding units thereby to by-pass the tails and engage and devein the bodies of shrimp moved through said deveining station by said holding units, a combined pressure spreading roller and body slitting knife at said cleaning station, means for operating said pressure spreading roller and pressure slitting knife in timed relation to movement of said holding units thereby to by-pass the tails and engage the bodies of passing shrimp to slit and spread open the dorsal sides of said shrimp bodies, raking means at said cleaning station comprising a plurality of closely spaced yieldable raking elements positioned to rake debris from the spread open bodies of shrimp emerging from engagement with spreading and slitting means, and means at said shell removing station for removing the body and tail from the shell of individual shrimp moved into said shell removing station by said successive holding units.

17. In a shrimp cleaning machine, the combination of a plurality of holding units, means for moving said holding units through a predetermined path, means for supplying shrimp to the holding units, each holding unit including means for gripping and holding a shrimp along the underside thereof, deveining means positioned at a deveining station along said path to rip open the dorsal side of shrimp moved to said deveining station, pressure spreading means mounted alongside said path to engage and spread open the dorsal side of shrimp moved thereby from said deveining station, raking means positioned alongside said path to engage and rake clear of debris the exposed dorsal side of shrimp moved thereby from said pressure spreading means, said raking means including a plurality of juxtaposed yieldable shrimp engaging elements having shrimp engaging ends positioned closely adjacent each other, and shrimp body engaging and holding means disposed along said path at a shell removing station for removing the bodies from the shells of shrimp carried into said shell removing station by said holding units.

18. In a shrimp cleaning machine, a movable shrimp holding unit comprising, in combination, a pair of clamping elements opposing each other for clamping the underbelly of a shrimp, a tail deflector element positioned just ahead of said clamping elements and defining a tail deflecting surface shaped to extend rearwardly and outwardly from the front of the tail deflector element sufficiently to shield the adjacent forward portions of said clamping elements, and a pair of shell rupturing elements opposing each other in general alignment with said tail deflecting element to rupture an intervening portion of the shell of a shrimp clamped along the underbelly thereof by said clamping elements.

19. For use in a shrimp cleaning machine, a shrimp holding unit comprising, in combination, means defining a longitudinal holding position for shrimp, opposing shrimp shell clamping elements movably disposed on opposite sides of said shrimp position for movement toward and away from each other for clamping and releasing the shell of a shrimp disposed in said shrimp position, opposing shell rupturing elements movably disposed on opposite sides of said shrimp position for movement toward and away from each other independently of said shell clamping elements, each of said shell rupturing elements including a plurality of shrimp engaging protuberances projecting toward said shrimp position, means for effecting movement of said shell rupturing elements toward each other for engaging and rupturing an intervening shrimp shell, and a depressible protuberance clearing element mounted on each of said shell rupturing elements in adjacent relation to said protuberances thereon and being spring biased toward said shrimp position to be depressed upon movement of the opposing rupturing elements against an intervening shrimp and to operate upon movement of said rupturing elements away from each other to dislodge foreign matter from the adjacent protuberances.

20. A shrimp cleaning machine comprising, in combination, an endless series of shrimp holding units mounted for circulation through a closed path in a predetermined direction; a tail gripping station, a shell gripping station, a shell rupturing station, a shell ripping and deveining station, a shell removing station and a shell release station spaced from each other along said path; said shell gripping station being located between said tail gripping station and said shell rupturing station, said shell release station being located between said shell removing station and said tail gripping station, means for supplying a succession of shrimp tail first to said tail gripping station, each holding unit including tail gripping means for gripping the tail of a shrimp at said tail gripping station and moving the shrimp to said shell gripping station, each holding unit including shell gripping means for gripping the main portion of a shrimp shell at said shell gripping station, each holding unit including shell rupturing means positioned on the holding unit for engaging and rupturing the shell of a supported shrimp at a position longitudinally along the shrimp which is disposed at least partially beyond said shell gripping means in the direction of said tail gripping means of the unit, means for moving said rupturing means of each unit to rupture the shell of a supported shrimp as the unit moves through said shell rupturing station, means for releasing said rupturing means of each unit from a shrimp in the unit before the unit reaches said shell removing station, a shell ripping and deveining element located at said ripping and deveining station; means for operating the ripping and deveining element in timed relation to movement of the holding units thereby to skip over the tails and to engage, rip open and remove the sand veins from the bodies of the shrimp carried through said ripping and deveining station by the successive holding units; means for releasing said tail gripping means of each holding unit before the unit reaches said shell removing station, means at said shell removing station for engaging and removing the bodies with the tails intact from the shells of successive shrimp moved into said shell removing station by the successive holding units, and means for effecting release of the shell gripping means of each holding unit as the unit passes through said shell release station.

21. A shrimp cleaning machine comprising, in combination, an annular array of shrimp holding units mounted for circulaiton through a closed path in a predetermined direction; a shell gripping station, a shell rupturing station, a shell ripping and deveining station, a shell removing station and a shell release station circumferentially spaced from each other along said path; said shell rupturing station being located between said shell gripping station and said shell removing station, said shell release station being located between said shell removing station and said shell gripping station, means for supplying a succession of shrimp to successive holding units moving from said shell release station to said shell gripping station, each holding unit including shell gripping means shaped to engage and grip the shell of a shrimp in the unit along a major portion of the length of the shell while at the same time leaving a tail portion of the shrimp free of the gripping means, means for applying the shell gripping means of each holding unit as the unit moves through said shell gripping station, each holding unit including shell rupturing means positioned for engaging and rupturing the shell of a supported shrimp at a position longitudinally along the shrimp which is disposed at least partially beyond said shell gripping means, means for moving said rupturing means of each unit to rupture the shell of a supported shrimp as the unit moves through said shell rupturing station, means for releasing said rupturing means of each unit from a shrimp in the unit before the unit reaches said shell removing station, a shell ripping and deveining element located at said ripping and deveining staiton; means for operating the ripping and deveining element in timed relation to movement of the holding units thereby to skip over the tails and to engage, rip open and remove the sand veins from the bodies of the shrimp carried through said ripping and deveining station by the successive holding units, means at said shell removing station for engaging and removing the bodies with the tails intact from the shells of successive shrimp moved into said shell removing station by the successive holding units, and means for effecting release of the shell gripping means of each holding unit as the unit passes through said shell release station.

22. In a shrimp cleaning machine, the combination of a plurality of shrimp holding units; means for moving said units in succession through a pickup station, a deveining station, and a shell removing station; an endless flexible conveyor for moving a procession of shrimp to said pickup station to be picked up by successive holding units moving through said pickup station; said conveyor having a generally horizontal run portion extending to said pickup station; said conveyor including an endless train of elongated shrimp trays disposed in mutually parallel, side-by-side relation to each other; each of said trays being tapered toward one end thereof to cradle a shrimp therein, means forming a visible marker at said one end of the trays for use in locating shrimp longitudinally within the trays, and a shrimp loading board disposed in adjacent substantially flush relation to said generally horizontal run of the conveyor for supporting a random supply of shrimp in position to be conveniently picked up and manually loaded in passing trays of the conveyor.

23. For use in a shrimp cleaning machine, a shrimp holding unit comprising, in combination, means defining a longitudinal position for shrimp, opposing shrimp shell clamping elements disposed on opposite sides of said shrimp position for movement toward and away from each other for clamping and releasing the shell of a shrimp disposed in said shrimp position, two opposed shell rupturing elements movably disposed on opposite sides of said shrimp position for movement toward and away from each other independently of said shell clamping elements, each of said shell rupturing elements including a plurality of shrimp engaging protuberances projecting toward said shrimp position in opposing relation to the other of said rupturing elements and at a location longitudinally along said shrimp position which is disposed at least partially beyond said clamping elements in a longitudinal direction with respect to said shrimp position, means for effecting movement of said shell rupturing elements toward each other for engaging and rupturing an intervening shrimp shell at said location, and a depressible protuberance clearing element mounted on each of said shell rupturing elements in adjacent relation to said protuberances thereon and being spring biased toward said shrimp position to be depressed upon movement of said rupturing elements against an intervening shrimp and to operate upon movement of said rupturing elements away from each other to dislodge foreign matter from the adjacent protuberances.

24. A shrimp cleaning machine comprising, in combination; an endless series of shrimp holding units mounted for circulation in a predetermined direction through a closed path extending past a shell gripping station, a shell rupturing station, a deveining station, a shell removing station, and a shell release station spaced from each other along said path; said shell rupturing station being located between said shell gripping station and said shell removing station, said shell release station being located between said shell removing station and said shell gripping station, each holding unit including shell gripping means shaped to engage and grip only a major longitudinal portion of the shell of a shrimp in the unit, means for positioning on each successive holding unit which moves into said shell gripping station a shrimp located so that a major portion of the shrimp shell is alined with said gripping means and the tail of the shrimp extends beyond the gripping means, means for applying the shell gripping means of each holding unit as the unit moves through said shell gripping station, each holding unit including shell rupturing elements positioned for engaging and rupturing the shell of a shrimp on the unit at a position longitudinally along the shrimp which is disposed at least partially beyond said shell gripping means, said shell rupturing elements of each unit being movable independently of the shell gripping means of the unit, rupturing element operating means for operating the shell rupturing elements of each unit as the unit moves through said shell rupturing station to rupture the shell of a shrimp carried by the unit, said rupturing element operating means including means for effecting release of said rupturing elements of each unit from a shrimp in the unit before the unit reaches said shell removing station, a deveining element located at said deveining station for removing the said veins from shrimp carried through said deveining station by the successive holding units, means at said shell removing station for engaging and removing the bodies with the tails intact from the shells of successive shrimp moved into said shell removing station by the successive holding units, and means for effecting release of the shell gripping means of each holding unit as the unit passes through said shell release station.

25. A shrimp cleaning machine comprising, in combination; a plurality of shrimp holding units mounted for circulation in a predetermined direction through a closed path extending past a shell gripping station, a shell rupturing station, a deveining station, a shell removing station, and a shell release station spaced from each other along said path; said shell rupturing station being located between said shell gripping station and said shell removing station, said shell release station being located between said shell removing station and said shell gripping station, each holding unit including opposed shell gripping elements shaped to engage and grip only a major longitudinal portion of the shell of a shrimp in the unit, means for positioning on each successive holding unit which moves into said shell gripping station a shrimp located so that only a major portion of the shrimp shell is disposed between said gripping elements on the unit and the tail of the shrimp extends lengthwise beyond the gripping elements, means for moving the gripping elements of each unit toward each other for gripping an intervening shrimp shell as the unit moves through said shell gripping station, each holding unit including opposed shell rupturing elements movable independently of said shell gripping elements of the unit, said rupturing elements being positioned for engaging and rupturing the shell of a shrimp on the unit at a position longitudinally along the shrimp which is disposed at least partially beyond said shell gripping elements, operating means for operating the shell rupturing elements of each unit as the unit moves through said shell rupturing station to engage and rupture the shell of a shrimp carried by the unit, said operating means including means for effecting movement of said rupturing elements of each unit away from each other before the unit reaches said shell removing station, a deveining element located at said deveining station for removing the said veins from shrimp carried through said deveining station by the successive holding units, means at said shell removing station for engaging and removing the bodies with the tails intact from the shells of successive shrimp moved into said shell removing station by the successive holding units, and means for effecting release of the shell gripping means of each holding unit as the unit passes through said shell release station.

26. A shrimp cleaning machine comprising, in combination; an endless series of shrimp holding units mounted for circulation in a predetermined direction through a closed path extending past a shell gripping station, a shell rupturing station, a deveining station, a shell removing station, and a shell release station spaced from each other along said path; said shell rupturing station being located between said shell gripping station and said shell removing station, said shell release station being located between said shell removing station and said shell gripping station, each holding unit defining a longitudinal shrimp position thereon and including opposed shell gripping elements disposed on opposite sides of said shrimp position on the unit and being shaped to engage and grip only a major longitudinal portion of the shell of a shrimp disposed in said shrimp position on the unit, means for positioning on each successive holding unit which moves into said shell gripping station a shrimp located in said shrimp position on the unit so that a portion of the shrimp intervenes between said gripping elements and the tail of the shrimp extends lengthwise beyond said gripping elements, means for moving the gripping elements of each unit toward each other for gripping an intervening shrimp shell as the unit moves through said shell gripping station, each holding unit including shell rupturing jaws pivotally supported on the unit and opposing each other across said shrimp position on the unit, each of said rupturing jaws of each unit including a plurality of shell engaging protuberances extending toward the other jaw at a location longitudinally along the adjacent shrimp position which is disposed at least partially beyond said shell gripping elements on the unit, spring means normally urging said rupturing jaws away from each other, cam means located at said shell rupturing station for moving the shell rupturing jaws of each unit toward each other as the unit moves through said shell rupturing station to rupture the shell of a shrimp carried by the unit, said cam means being shaped to effect movement of said rupturing jaws of each unit away from each other before the unit reaches said shell removing station, a deveining element located at said deveining station for removing the sand veins from shrimp carried through said deveining station by the successive holding units, means at said shell removing station for engaging and removing the bodies with the tails intact from the shells of successive shrimp moved into said shell removing station by the successive holding units, and means for effecting release of the shell gripping means of each holding unit as the unit passes through said shell release station.

27. A shrimp cleaning machine comprising, in combination; an endless series of shrimp holding units mounted for circulation in a predetermined direction through a closed path extending past a shell gripping station, a shell rupturing station, a deveining station, a shell removing station, and a shell release station spaced from each other along said path; said shell rupturing station being located between said shell gripping station and said shell removing station, said shell release station being located between said shell removing station and said shell gripping station, each holding unit defining a longitudinal shrimp position thereon and including opposed shell gripping elements disposed on opposite sides of said shrimp position and being shaped to engage and grip only a major longitudinal portion of the shell of a shrimp disposed in said shrimp position on the unit, means for positioning on each successive holding unit which moves into said shell gripping station a shrimp located in said shrimp position on the unit so that a portion of the shrimp intervenes between said gripping elements and the tail of the shrimp extends lengthwise beyond said gripping elements, means for moving the gripping elements of each unit toward each other for gripping an intervening shrimp shell as the unit moves through said shell gripping station, each holding unit including shell rupturing elements movably supported on the unit in opposing relation to each other across said shrimp position on the unit, each of said rupturing elements including a plurality of shell engaging protuberances extending toward the other rupturing element at a location longitudinally along the adjacent shrimp position which is disposed at least partially beyond said shell gripping elements, means normally urging said rupturing elements away from said shrimp position on the unit, means located at said rupturing station for effecting movement of the shell rupturing elements of each unit toward and away from each other as an incident to movement of the unit through said shell rupturing station to rupture the shell of a shrimp carried by the unit, a deveining element located at said deveining station for removing the sand veins from shrimp carried through said deveining station by the successive holding units, means at said shell removing station for engaging and removing the bodies with the tails intact from the shells of successive shrimp moved into said shell removing station by the succeessive holding units, and means for effecting release of the shell gripping means of each holding unit as the unit passes through said shell release station.

References Cited in the file of this patent
UNITED STATES PATENTS

| | | |
|---|---|---|
| 2,716,776 | Streich et al. | Sept. 6, 1955 |
| 2,784,450 | Jonsson | Mar. 12, 1957 |
| 2,850,761 | Jonsson | Sept. 9, 1958 |
| 2,884,657 | Miller | May 5, 1959 |
| 2,955,317 | Merrick | Oct. 11, 1960 |
| 2,974,356 | Cerny | Mar. 14, 1961 |